US012806891B2

(12) United States Patent
Murai et al.

(10) Patent No.: US 12,806,891 B2
(45) Date of Patent: Nov. 24, 2026

(54) SPUN-BONDED NONWOVEN FABRIC, FILTER MEDIUM, AIR FILTER, AND APPARATUS FOR PRODUCING FILTER MEDIUM

(71) Applicant: Toray Industries, Inc., Tokyo (JP)

(72) Inventors: Kota Murai, Otsu (JP); Daiki Shimada, Otsu (JP); Yoshiki Tanaka, Otsu (JP); Ryuta Sakashita, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 19/124,904

(22) PCT Filed: Nov. 9, 2023

(86) PCT No.: PCT/JP2023/040349
§ 371 (c)(1),
(2) Date: Apr. 28, 2025

(87) PCT Pub. No.: WO2024/116767
PCT Pub. Date: Jun. 6, 2024

(65) Prior Publication Data

US 2026/0152885 A1 Jun. 4, 2026

(30) Foreign Application Priority Data

Nov. 30, 2022 (JP) ................................ 2022-191327
Aug. 31, 2023 (JP) ................................ 2023-141018

(51) Int. Cl.
*B32B 37/06* (2006.01)
*B01D 39/16* (2006.01)
(Continued)

(52) U.S. Cl.
CPC ............ *B32B 37/06* (2013.01); *B01D 39/163* (2013.01); *B32B 38/06* (2013.01); *D01D 5/0885* (2013.01);
(Continued)

(58) Field of Classification Search
CPC .... D04H 3/16; D04H 1/56; B01D 2239/0622; B01D 2239/0627; B01D 5/09885
See application file for complete search history.

(56) References Cited

U.S. PATENT DOCUMENTS 8,551,895 B2 * 10/2013 Yahiaoui ................ B32B 15/14
442/154
10,982,393 B2 * 4/2021 Barnholtz ........... D21H 27/002
(Continued)

FOREIGN PATENT DOCUMENTS

EP 4488437 A1 1/2025
JP 2003-260321 A 9/2003
(Continued)

OTHER PUBLICATIONS

International Search Report and Written Opinion mailed on Jan. 16, 2024, received for PCT Application PCT/JP2023/040349, filed on Nov. 9, 2023, 10 pages including English Translation.

*Primary Examiner* — Atul P. Khare
(74) *Attorney, Agent, or Firm* — XSENSUS LLP

(57) ABSTRACT

A spun-bonded nonwoven fabric including composite fibers containing, as constituent components, a polyester-based resin P1, and a thermoplastic resin P2 having a melting point lower by 20 °C or more than the melting point of the polyester-based resin P1, in which at least a part of a surface of the composite fibers is the thermoplastic resin P2, at least some of the contact points between fibers of the composite fibers have a micro bonding area having a length of 5 μm or more and 100 μm or less in a fiber axis direction, an average single-fiber diameter of the composite fibers is 15.0 μm or
(Continued)

more and 40.0 μm or less, and an average center-to-center distance between nearest neighbor fibers in a cross section in a transverse direction of the spun-bonded nonwoven fabric is 50 μm or less.

20 Claims, 4 Drawing Sheets

(51) Int. Cl.

| | |
|---|---|
| ***B32B 38/06*** | (2006.01) |
| ***D01D 5/088*** | (2006.01) |
| ***D01D 5/098*** | (2006.01) |
| ***D04H 1/4374*** | (2012.01) |
| ***D04H 1/4382*** | (2012.01) |
| ***D04H 1/56*** | (2006.01) |
| ***D04H 3/011*** | (2012.01) |
| ***D04H 3/16*** | (2006.01) |
| *B32B 3/30* | (2006.01) |
| *B32B 5/02* | (2006.01) |
| *B32B 5/26* | (2006.01) |
| *D04H 1/541* | (2012.01) |
| *D04H 3/147* | (2012.01) |

(52) U.S. Cl.

CPC ......... *D01D 5/0985* (2013.01); *D04H 1/4374* (2013.01); *D04H 1/43828* (2020.05); *D04H 1/56* (2013.01); *D04H 3/011* (2013.01); *D04H 3/16* (2013.01); *B01D 39/16* (2013.01); *B01D 2239/0216* (2013.01); *B01D 2239/0435* (2013.01); *B01D 2239/0622* (2013.01); *B01D 2239/0627* (2013.01); *B01D 2239/065* (2013.01); *B01D 2239/0668* (2013.01); *B01D 2239/10* (2013.01); *B01D 2239/1233* (2013.01); *B01D 2239/1291* (2013.01); *B32B 3/30* (2013.01); *B32B 5/022* (2013.01); *B32B 5/269* (2021.05); *B32B 5/271* (2021.05); *B32B 2250/20* (2013.01); *B32B 2262/0253* (2013.01); *B32B 2262/0276* (2013.01); *B32B 2262/124* (2021.05); *B32B 2305/28* (2013.01); *B32B 2367/00* (2013.01); *B32B 2571/00* (2013.01); *D04H 1/5412* (2020.05); *D04H 3/147* (2013.01); *D10B 2505/04* (2013.01)

(56) References Cited

U.S. PATENT DOCUMENTS

| | | | | |
|---|---|---|---|---|
| 2002/0004349 | A1 * | 1/2002 | Tsujiyama | ........ A61F 13/15203 442/381 |
| 2005/0077646 | A1 | 4/2005 | Akiba et al. | |
| 2018/0369737 | A1 | 12/2018 | Shimada et al. | |
| 2023/0026227 | A1 | 1/2023 | Ikejiri et al. | |

FOREIGN PATENT DOCUMENTS

| | | | | |
|---|---|---|---|---|
| JP | 2009013558 | A * | 1/2009 | |
| WO | 03/060216 | A1 | 7/2003 | |
| WO | 2017/110365 | A1 | 6/2017 | |
| WO | 2020/116569 | A1 | 6/2020 | |
| WO | 2021/132402 | A1 | 7/2021 | |
| WO | WO-2021153296 | A1 * | 8/2021 | ......... B01D 46/0032 |
| WO | 2023/167057 | A1 | 9/2023 | |

* cited by examiner

SPUN-BONDED NONWOVEN FABRIC, FILTER MEDIUM, AIR FILTER, AND APPARATUS FOR PRODUCING FILTER MEDIUM

CROSS-REFERENCE TO RELATED APPLICATIONS

This application is a national stage application, pursuant to 35 U.S.C. § 371, of International Patent Application No. PCT/JP2023/040349, filed Nov. 9, 2023, which claims priority to Japanese Patent Application No. 2022-191327, filed Nov. 30, 2022, and Japanese Patent Application No. 2023-141018, filed Aug. 31, 2023, the entire contents of each are incorporated herein by reference.

TECHNICAL FIELD

The present invention relates to a spun-bonded nonwoven fabric and a filter medium.

BACKGROUND ART

In recent years, there has been advancing sophistication and diversification of filters for automobiles and household air purifiers, and since a global epidemic of COVID-19 in 2020, demands for antiviral performance have been increasing steadily in addition to antibacterial performance, deodorizing performance, or the like.

In addition, efforts to achieve a sustainable society are accelerating worldwide, including adoption of Sustainable Development Goals (SDGs) at the UN summit. Under such circumstances, there is an increasing demand for filter media with a low environmental impact in filters for automobiles and household air purifiers.

In these filters, a pleated filter medium comprising a filter medium layer with dust removing performance and the like and an aggregate layer that reinforces or retains the shape of the filter medium layer, is widely used. A nonwoven fabric mainly composed of short fibers or long fibers is used for the aggregate layer.

For example, regarding the aggregate layer, Patent Document 1 proposes a long-fiber nonwoven fabric made of fibers having an average fiber diameter within a specific range, with a basis weight, a stress at 10% elongation at 80 °C in an MD direction, and a folding angle after pressing for 10 seconds at 80 °C under a pressure of 5.2 kPa all within specific ranges. According to this, it is described that a long-fiber nonwoven fabric suitable for a filter reinforcing material can be obtained, which has excellent pleating processability, possesses a rigidity that makes it difficult for pleats to adhere tightly under actual use, and is excellent in pleat shape retention.

On the other hand, regarding the filter medium layer, a nonwoven fabric mainly composed of short fibers or long fibers is used, but to achieve higher dust removing performance, an electret nonwoven fabric is used. For example, Patent Document 2 proposes a technique of electret processing where fine water droplets are sprayed onto a spun yarn before being formed into a nonwoven fabric using a two-fluid spray nozzle.

PRIOR ART DOCUMENT

Patent Documents

Patent Document 1: International Publication No. 2020/116569

Patent Document 2: International Publication No. 2003/060216

SUMMARY OF THE INVENTION

Problems to be Solved by the Invention

In an aggregate layer, according to the long-fiber nonwoven fabric as proposed in Patent Document 1, when compared with a filter aggregate before the nonwoven fabric was proposed, an increase in pressure loss of a filter unit is suppressed, and pleating is easily performed. However, in the long-fiber nonwoven fabric as proposed in the document, there is a problem that a higher level of performance cannot be achieved due to insufficient liquid retention of functional agents or the like in response to the demand for higher functionality that has been increasing in recent years.

In addition, when using an electret nonwoven fabric as proposed in Patent Document 2 in a filter medium layer, if a conical nozzle is used for spraying water for electretization, the discharge distribution form a mountain shape with respect to an alignment direction of spun yarns (that is, a transverse direction of the nonwoven fabric). Due to that, it is not possible to apply an equal amount of water droplets along the alignment direction, making it difficult to exhibit electret performance uniformly in the transverse direction of the nonwoven fabric.

Furthermore, in general, as a filter medium, a laminated nonwoven fabric obtained by bonding an aggregate layer and an electret filter medium layer, which are separately produced, through lamination processing is often used. However, such a filter medium requires a multi-step process in a manufacturing process, which leads to a problem of increasing production cost and production time.

Therefore, the present invention has been made in view of the above circumstances, and an object thereof is to provide a spun-bonded nonwoven fabric which is excellent in pleating processability and shape retention, and excellent in air permeability, and suitable for imparting functionality. Also, another object of the present invention is to provide an apparatus for producing a filter medium capable of reducing production cost and production time when producing a filter medium by laminating an electret nonwoven fabric on the spun-bonded nonwoven fabric.

Solutions to the Problems

As a result of intensive studies to achieve the above objects, the present inventors have found that when a spun-bonded nonwoven fabric including composite fibers composed of a combination of specific resins has a structure in which at least a part of a surface of the composite fibers is made of a specific thermoplastic resin, and at least some of the contact points between fibers of the composite fibers have a micro bonding area with a length of 5 μm or more and 100 μm or less in a fiber axis direction, has an average single-fiber diameter within a specific range, and has an average center-to-center distance between nearest neighbor fibers in the cross section of the nonwoven fabric transverse direction at or below a specific range, the strength, rigidity, and air permeability are significantly improved, and excellent pleating processability and shape retention can be imparted, while also significantly enhancing an effect of imparting functionality as compared with conventional filter aggregates.

In addition, it was also found that the spun-bonded nonwoven fabric can reduce the basis weight when used as a filter aggregate compared to conventional materials, resulting in a decrease in the environmental impact by reducing the amount of plastic used.

Furthermore, it was found that when producing a filter medium in which an electret nonwoven fabric is laminated on the spun-bonded nonwoven fabric as described above is produced, the filter medium can be produced in one step while reducing the production cost and the production time. In this case, it was also found that a filter medium in which the electret performance is uniformly exhibited in the transverse direction can be produced by discharging each air and water from separate discharge openings of a spray nozzle and spraying fine water droplets generated outside the nozzle onto the electret melt blown nonwoven fibers.

The present invention has been completed based on these findings, and according to the present invention, the following inventions are provided.

[1]A spun-bonded nonwoven fabric including a composite fibers containing, as constituent components, a polyester-based resin P1, and a thermoplastic resin P2 having a melting point lower by 20 °C or more than the melting point of the polyester-based resin P1, in which at least a part of a surface of the composite fibers is the thermoplastic resin P2, at least some of the contact points between fibers of the composite fibers have a micro bonding area having a length of 5 μm or more and 100 μm or less in a fiber axis direction, an average single-fiber diameter of the composite fibers is 15.0 μm or more and 40.0 μm or less, and an average center-to-center distance between nearest neighbor fibers in a cross section in a transverse direction of the spun-bonded nonwoven fabric is 50 μm or less.

[2] The spun-bonded nonwoven fabric according to [1], in which, in the composite fibers, a proportion by number of composite fibers having a center-to-center distance between nearest neighbor fibers in the cross section in the transverse direction of 15 μm or more and 40 μm or less is 40% or more.

[3] The spun-bonded nonwoven fabric according to [1] or [2], in which the spun-bonded nonwoven fabric has regularly arranged macro bonding areas, and a shortest distance between adjacent macro bonding areas is 0.5 mm or more and 2.0 mm or less.

[4] The spun-bonded nonwoven fabric according to any one of [1] to [3], in which an apparent specific surface area is 980 $cm^2/g$ or more.

[5]A filter medium including the spun-bonded nonwoven fabric according to any one of [1] to [4].

[6] An air filter including the filter medium according to [5].

[7] An apparatus for producing a filter medium including: a first web forming assembly that forms a spun-bonded nonwoven fiber web; a second web forming assembly that forms an electret melt blown nonwoven fiber web on the spun-bonded nonwoven fiber web to form a laminated web; a first thermal bonding assembly that thermally bonds the laminated web to form a macro bonding area in the laminated web; and a second thermal bonding assembly that causes hot air to penetrate the laminated web to form a micro bonding area in the spun-bonded nonwoven fiber web, in which the first web forming assembly includes: a spinning spinneret A having a plurality of discharge holes that spins out two kinds of thermoplastic resins melted in an extruder as composite fibers; a drawing device that suction-draws the spun composite fibers with compressed air; and a collection device that collects the stretched composite fibers to form a spun-bonded nonwoven fiber web, the second web forming assembly includes: a spinning spinneret B of a non-electroconductive polymer having a plurality of spinning holes in a width direction; and a water sprayer for the spun yarn discharged from the discharge spinneret B, in which the water sprayer includes a plurality of water discharge openings arranged in the width direction and a pair of air discharge openings that opens either continuously or intermittently in the width direction and is located so as to sandwich the water discharge openings and is a spray nozzle configured to cause air discharged from the air discharge openings to collide with water discharged from the plurality of water discharge openings, the first thermal bonding assembly is (configured to include): either a pair of thermal embossing rolls with engraving applied to at least one roll surface, or an ultrasonic horn, and the second thermal bonding assembly includes: a conveying device for the laminated web, the conveying device including a drum or a belt; a heating device for an atmosphere in which the laminated web is located; and an exhaust device that sucks and exhausts air from a side of the conveying device opposite to a side with which the laminated web comes into contact.

Effects of the Invention

According to the present invention, a spun-bonded nonwoven fabric which is excellent in pleating processability and shape retention, excellent in air permeability, and suitable for imparting functionality can be provided. Thus, from these properties, the spun-bonded nonwoven fabric of the present invention can be suitably used particularly as an aggregate or a base material for a filter.

In addition, according to the present invention, a filter medium in which an electret nonwoven fabric is laminated on the spun-bonded nonwoven fabric can be produced in one step while reducing the production cost and the production time.

EMBODIMENTS OF THE INVENTION

Figure 1:
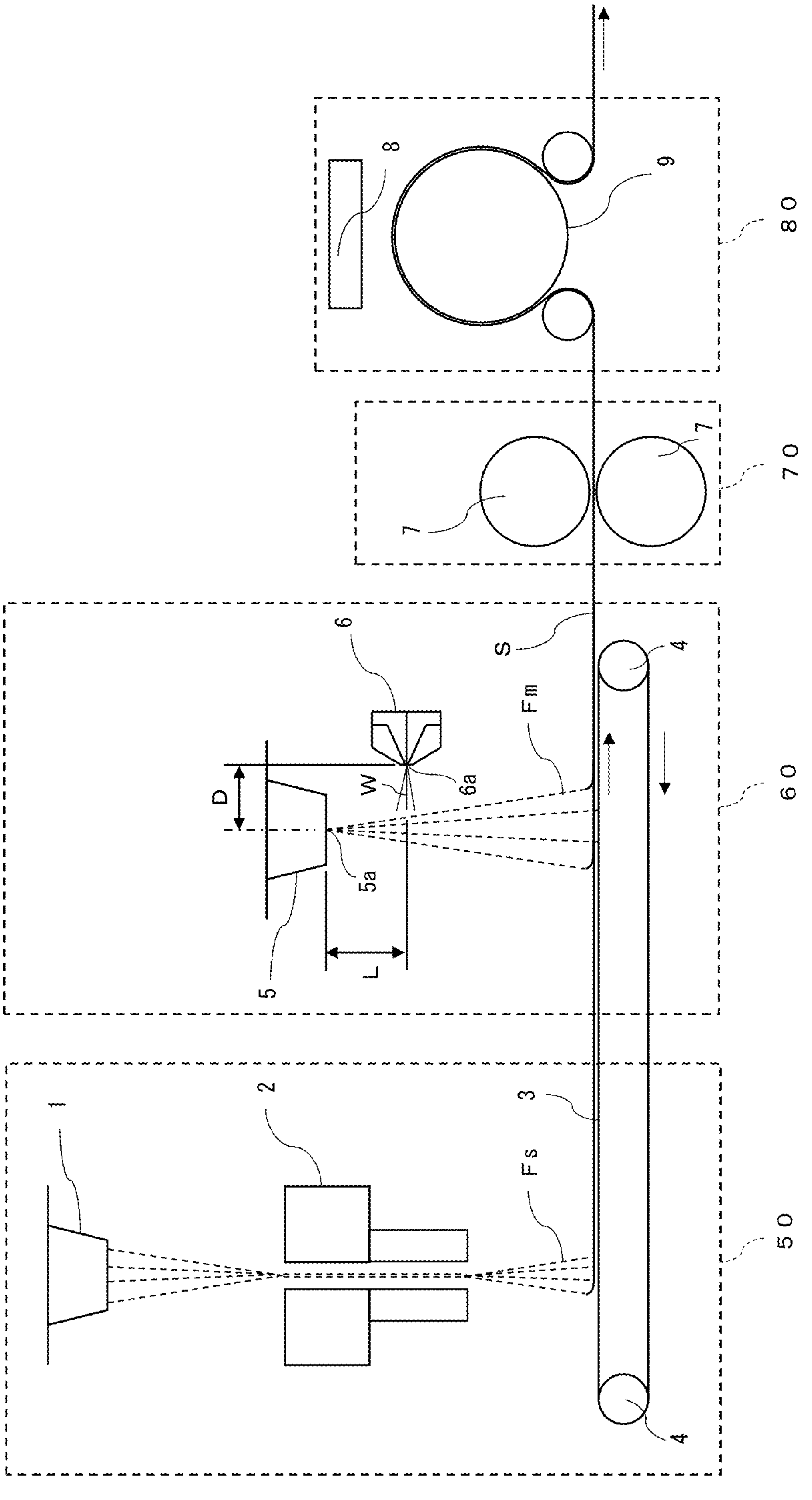
FIG. 1 is a schematic view exemplifying an apparatus for producing a filter medium of the present invention.

A spun-bonded nonwoven fabric of the present invention includes composite fibers composed of a polyester-based resin P1, and a thermoplastic resin P2 having a melting point lower by 20 °C or more than the melting point of the polyester-based resin P1, in which at least a part of a surface of the composite fibers is the thermoplastic resin P2, at least some of the contact points between fibers of the composite fibers have a micro bonding area having a length of 5 μm or more and 100 μm or less in a fiber axis direction, an average single-fiber diameter of the composite fibers is 15.0 μm or more and 40.0 μm or less, and an average center-to-center distance between nearest neighbor fibers in a cross section in a transverse direction of the spun-bonded nonwoven fabric is 50 μm or less.

Here, in the present invention, the "transverse direction" of a spun-bonded nonwoven fabric refers to a direction (CD direction, Cross Direction) perpendicular to the sheet conveyance direction during production of the spun-bonded nonwoven fabric, the sheet conveyance direction being the winding direction of a nonwoven fabric roll. The "longitudinal direction" of a spun-bonded nonwoven fabric refers to the sheet conveyance direction during production of the spun-bonded nonwoven fabric, that is, the winding direction of the nonwoven fabric roll (MD direction, Machine Direction). In a case where a longitudinal direction can be determined from the appearance of the spun-bonded nonwoven fabric, that is, in a case where a winding direction of the nonwoven fabric roll can be uniquely determined, this direction is defined as the longitudinal direction, and a direction perpendicular to the longitudinal direction is defined as a transverse direction. On the other hand, in a case where a longitudinal direction or a transverse direction cannot be determined from an appearance, for example, in a case where a spun-bonded nonwoven fabric is not in a rolled state due to cutting or the like, a longitudinal direction and a transverse direction are determined by the following procedure.

(a) In a plane of a spun-bonded nonwoven fabric, any one direction is determined, and three test pieces having a length of 30.0 cm and a width of 5.0 cm are taken at equal intervals along the direction. However, only in a case where an area of a spun-bonded nonwoven fabric is small and the above three test pieces cannot be secured, test pieces are collected in which dimensions (length and width) of the test pieces are reduced to a lower limit of 18.0 cm in length and 2.0 cm in width.

(b) Also, in directions rotated by 30 degrees, 60 degrees, 90 degrees, 120 degrees, and 150 degrees from the direction (0 degrees) of collection in (a), three test pieces each having a length of 30 cm and a width of 5.0 cm are similarly collected.

(c) The tensile strength for the test piece of each direction is measured in accordance with 6.3 "Breaking force and elongation" in "Test methods for general long-fiber nonwoven fabrics" specified in JIS L 1913:2010. Specifically, under the conditions of a grip interval of 20.0 cm (however, in a case where a dimension of a test piece is smaller than the length of 30.0 cm, a grip interval is set to a length obtained by subtracting 10 cm from the length of the test piece) and a tensile speed of 100±10 mm/min, a load is applied until a sample is cut, the strength of the sample at the maximum load is defined as a tensile strength (N/5 cm), an average value of three points is calculated, and the value rounded off to the nearest whole number is defined as the tensile strength in the direction.

(d) A direction in which the value obtained by the measurement is the highest is defined as a longitudinal direction of the spun-bonded nonwoven fabric, and a direction perpendicular thereto is defined as a transverse direction. However, in a case where there are two or more highest directions, it is assumed as follows.

A direction having a lower tensile strength in a direction perpendicular to the "highest direction" is defined as a longitudinal direction of the spun-bonded nonwoven fabric. For example, in a case where the tensile strengths of the test pieces at 0 degrees and 30 degrees are highest, the tensile strengths in directions perpendicular thereto, that is, 90 degrees and 120 degrees are compared. In a case where the test piece at 90 degrees has a low tensile strength, 0 degrees is defined as the longitudinal direction, and in a case where the test piece at 120 degrees has a low tensile strength, 30 degrees is defined as the longitudinal direction.

In a case where the tensile strengths in the directions perpendicular to the "highest direction" are also equal, for example, in a case where the tensile strengths in all the six directions are equal, one of the six directions is defined as the longitudinal direction, and the direction perpendicular thereto is defined as the transverse direction.

By doing so, it is possible to obtain a spun-bonded nonwoven fabric which has sufficient strength and rigidity that can be put to practical use, is excellent in air permeability, is suitable for imparting functionality, and can further reduce an environmental impact.

Hereinafter, constituent elements of the present invention will be described in detail, but the present invention is not limited to the scope described below at all without departing from the gist thereof.

[Polyester-Based Resin P1]

The spun-bonded nonwoven fabric of the present invention is composed of composite fibers containing a polyester-based resin P1 as a constituent component. This makes it possible to provide a spun-bonded nonwoven fabric having sufficient strength or rigidity that can be put to practical use. In the present invention, the "polyester-based resin" refers to each polyester resin such as polyethylene terephthalate which will be described later, mixtures and copolymers thereof, and those obtained by adding an additive to these resins. Hereinafter, the same applies to those described as " . . . -based resin" unless otherwise specified.

The polyester-based resin P1 contains, as a main component, a high molecular weight polymer obtained from an acid component and an alcohol component as monomers. In the present invention, "containing . . . as a main component" means that a proportion of the mass of the component to a total mass is more than 50 mass %. Hereinafter, unless otherwise specified, the same applies to those described as "containing . . . as a main component".

Examples of the acid component which may be used include aromatic carboxylic acids such as phthalic acid (ortho form), isophthalic acid, and terephthalic acid; aliphatic dicarboxylic acids such as adipic acid and sebacic acid; and alicyclic dicarboxylic acids such as cyclohexanecarboxylic acid. Examples of the alcohol component which may be used include ethylene glycol, diethylene glycol, and polyethylene glycol.

Specific examples of the polyester-based resin P1 include polyethylene terephthalate (PET), polybutylene terephthalate (PBT), polytrimethylene terephthalate (PTT), polyethylene naphthalate (PEN), polylactic acid (PLA), and polybutylene succinate (PBS). Among these, PET which has a high melting point and excellent heat resistance, as well as excellent strength and rigidity is preferably used.

Also, additives such as an antioxidant, a weathering stabilizer, a light stabilizer, a heat stabilizer, an antistatic agent, a charge retention agent, an anti-fogging agent, an anti-blocking agent, a matting agent, an antifungal agent, an antibacterial agent, an antiviral agent, a flame retardant, a metal oxide, a hydrophilic agent, a nucleating agent, a pigment, a lubricant including polyethylene wax, and an aliphatic bisamide and/or an aliphatic monoamide, which are usually used, or other polymers can be added, as necessary, to the polyester-based resin P1 as long as the effect of the present invention is not impaired.

A melting point of the polyester-based resin P1 is preferably 200 °C or higher and 320 °C or lower. When the polyester-based resin P1 has a melting point of preferably 200 °C or higher, more preferably 220 °C or higher, and still more preferably 240 °C or higher, a spun-bonded nonwoven fabric excellent in heat resistance can be obtained. On the other hand, when the polyester-based resin P1 has a melting point of preferably 320 °C or lower, more preferably 300 °C or lower, and still more preferably 280 °C or lower, energy consumption during production of a nonwoven fabric can be suppressed, and thermal deterioration of the thermoplastic resin P2, which will be described later, having a melting point lower than that of the polyester-based resin P1 by 20 °C or more during production of a nonwoven fabric can be suppressed. In addition, yarns discharged from a spinning spinneret are easily cooled, excessive bonding between fibers is suppressed, and a spun-bonded nonwoven fabric with excellent uniformity of formation is obtained.

Herein, the melting point of the polyester-based resin P1 refers to the maximum melting peak temperature obtained by measuring the polyester-based resin P1 by a differential scanning calorimetry (DSC). In a case where the melting point of the polyester-based resin P1 is measured from a spun-bonded nonwoven fabric or a composite fiber constituting the spun-bonded nonwoven fabric, a value calculated according to procedures below is adopted.

(1) A composite fiber piece of 0.5 mg to 5 mg is collected from a spun-bonded nonwoven fabric. In a case of measuring from a composite fiber, a composite fiber piece of 0.5 mg to 5 mg is prepared by, for example, cutting the composite fiber.

(2) The composite fiber piece of (1) is heated from normal temperature to 350 °C at a heating rate of 20 °C/min using a differential scanning calorimeter (DSC, for example, "DSC 8500" manufactured by PerKin-Elmer Inc.) to obtain a DSC curve.

(3) A peak top temperature (melting peak temperature) of a melting endothermic peak is read from the DSC curve, and the highest melting peak temperature is defined as the melting point of the polyester-based resin P1.

The intrinsic viscosity (IV) of the polyester-based resin P1 is preferably 0.55 or more and 0.75 or less. When the intrinsic viscosity (IV) is preferably 0.55 or more, more preferably 0.60 or less, and still more preferably 0.62 or more, the single yarn strength increases. On the other hand, when the intrinsic viscosity (IV) is preferably 0.75 or less, more preferably 0.70 or less, and still more preferably 0.68 or less, the stringiness during production of a nonwoven fabric can be improved.

In the present invention, as for the intrinsic viscosity (IV) of the polyester-based resin P1, a value measured by the following method is adopted.

(1) 8 g of a sample was dissolved in 100 mL of ortho-chlorophenol, and a relative viscosity $\eta_r$ is determined according to the following formula using an Ostwald viscometer at a temperature of 25 °C.

$$\eta_r = \eta/\eta_0 = (t \times d)/(t_0 \times d_0)$$

Here, $\eta$ represents the viscosity of a polymer solution; $\eta_0$ represents the viscosity of ortho-chlorophenol; t represents the dropping time (seconds) of the solution; d represents the density of the solution (g/cm$^3$); $t_0$ represents the dropping time (seconds) of ortho-chlorophenol; and $d_0$ represents the density (g/cm$^3$) of ortho-chlorophenol.

(2) From the relative viscosity $\eta_r$, the intrinsic viscosity (IV) is calculated by the following formula, and rounded off to two decimal places.

$$\text{Intrinsic viscosity } (IV) = 0.0242\ \eta_r + 0.2634$$

[Thermoplastic Resin P2]

The spun-bonded nonwoven fabric of the present invention is composed of composite fibers containing the thermoplastic resin P2 as a constituent component.

The thermoplastic resin P2 has a melting point lower than that of the polyester-based resin P1 by 20 °C or more. When having a melting point lower than the melting point of the polyester-based resin P1 by 20 °C or more, preferably 50 °C or more, and more preferably 80 °C or more, sticking to a thermal embossing roll or the like in a production step which will be described later is suppressed, so that a spun-bonded nonwoven fabric excellent in strength and rigidity is obtained.

Herein, the melting point of the thermoplastic resin P2 refers to the maximum melting peak temperature obtained by measuring the thermoplastic resin P2 by differential scanning calorimetry (DSC). In a case where the melting point of the thermoplastic resin P2 is measured from a spun-bonded nonwoven fabric or a composite fiber constituting the spun-bonded nonwoven fabric, a value calculated according to procedures below is adopted.

(1) A composite fiber piece of 0.5 mg to 5 mg is collected from a spun-bonded nonwoven fabric. In a case of measuring from a composite fiber, a composite fiber piece of 0.5 mg to 5 mg is prepared by, for example, cutting the composite fiber.

(2) The composite fiber piece of (1) is heated from normal temperature to 350 °C at a heating rate of 20 °C/min using a differential scanning calorimeter (DSC, for example, "DSC 8500" manufactured by PerKin-Elmer Inc.) to obtain a DSC curve.

(3) A peak top temperature (melting peak temperature) of a melting endothermic peak is read from the DSC curve, and the lowest melting peak temperature is defined as the melting point of the thermoplastic resin P2.

Also, the melting point of the thermoplastic resin P2 is preferably 100 °C or higher and 240 °C or lower. When the melting point of the thermoplastic resin P2 is preferably 100 °C or higher, more preferably 110 °C or higher, and still more preferably 120 °C or higher, a spun-bonded nonwoven fabric having heat resistance that can withstand practical use is obtained. On the other hand, when the melting point of the thermoplastic resin P2 is preferably 240 °C or lower, more preferably 210 °C or lower, and still more preferably 180 °C or lower, a spun-bonded nonwoven fabric which prevents the occurrence of problems of sticking to a heating roll during thermal bonding, improves thermal adhesiveness, and is excellent in strength and rigidity is obtained.

Examples of the thermoplastic resin P2 include polybutylene terephthalate (PBT), polytrimethylene terephthalate (PTT), polylactic acid (PLA), and copolymerized polyethylene terephthalate (copolymerized PET) as polyester-based resins. Since the polyester-based resin has a high melting point, it is suitable for applications requiring high heat resistance, and among them, copolymerized PET is preferably used because it is excellent in spinnability. As a copolymerization component in the copolymerized PET, isophthalic acid which is excellent in spinnability is preferably used.

Examples of the thermoplastic resin P2 include polyethylene-based resins, polypropylene-based resins, polybutene-based resins, and polymethylpentene-based resins as polyolefin-based resins. Polyolefin-based resins are suitable for applications requiring thermal adhesiveness, and among them, polyethylene-based resins and polypropylene-based resins are preferably used because they are excellent in spinnability.

The polyethylene-based resin means a resin having an ethylene unit as a repeating unit, and examples thereof include a homopolymer of the ethylene and a copolymer of the ethylene and various α-olefins. Among these, the homopolymer of the ethylene is preferable for preventing a decrease in the spinning stability and the strength. As copolymers of ethylene and various α-olefins, copolymers of ethylene and α-olefins having 3 to 5 carbon atoms are preferable. Also, examples of the α-olefin having 3 to 5 carbon atoms include propylene, 1-butene, and 1-pentene, and among these, 1-butene is more preferable. According to this, entanglement of molecular chains during melting can be suppressed, yarn breakage can be suppressed, and a material can be prevented from being easily wound around a roll during thermal bonding due to an increase in amorphous components.

In a case where copolymers of ethylene and various α-olefins are used, a content of the α-olefins is preferably 0.1 mol % or more and 10 mol % with respect to polymerization components of the polyethylene-based resin. When the content of the α-olefins is preferably 0.1 mol % or more and 10 mol % or less, more preferably 0.1 mol % or more and 7 mol % or less, and still more preferably 0.1 mol % or more and 5 mol % or less, yarn breakage during spinning and sticking to a thermal embossing roll or the like in the production step which will be described later are suppressed, so that a spun-bonded nonwoven fabric having few surface defects such as wrinkles and irregularities is obtained.

Kinds of the α-olefin and a content of the α-olefin in the polymerization components of the polyethylene-based resin can be determined, for example, from a detection peak position and a peak area ratio obtained by a nuclear magnetic resonance apparatus (NMR).

Also, examples of the polyethylene-based resin include a medium-density polyethylene, a high-density polyethylene (hereinafter, may also be abbreviated as HDPE), and a linear low-density polyethylene (hereinafter, may also be abbreviated as LLDPE). Among these, HDPE or LLDPE is preferably used because yarn breakage during spinning in a production step which will be described later is suppressed, and a spun-bonded nonwoven fabric having few surface defects is obtained.

A melting point of the polyethylene-based resin is preferably 100 °C or higher and 150 °C or lower. When the melting point of the polyethylene-based resin is preferably 100 °C or higher, more preferably 110 °C or higher, and still more preferably 120 °C or higher, heat resistance that can put to practical use is easily obtained. Also, when the melting point is preferably 150 °C or lower, more preferably 140 °C or lower, and still more preferably 135 °C or lower, yarns discharged from a spinning spinneret are easily cooled and bonding between fibers is suppressed in the production step which will be described later, so that a spun-bonded nonwoven fabric with excellent uniformity of formation is obtained.

The solid density of the polyethylene-based resin is preferably 0.935 g/cm$^3$ or more and 0.970 g/cm$^3$ or less. When the solid density of the polyethylene-based resin is preferably 0.935 g/cm$^3$ or more, more preferably 0.940 g/cm$^3$ or more, and still more preferably 0.945 g/cm$^3$ or more, sticking to a thermal embossing roll or the like in the production step which will be described later is suppressed, so that a spun-bonded nonwoven fabric having few surface defects such as wrinkles and irregularities is obtained. Also, when the solid density of the polyethylene-based resin is preferably 0.970 g/cm$^3$ or less, more preferably 0.965 g/cm$^3$ or less, and still more preferably 0.960 g/cm$^3$ or less, yarn breakage during spinning in the production step which will be described later is suppressed, so that a spun-bonded nonwoven fabric having few surface defects is obtained.

On the other hand, examples of the polypropylene-based resin include homopolymers of propylene and copolymers of propylene with ethylene and various α-olefins. Among these, the homopolymer of propylene is preferable to prevent a decrease in spinning stability and strength.

In a case where the copolymer of propylene and various α-olefins are used, the copolymerization component is preferably ethylene or 1-butene and more preferably ethylene, because of its excellent spinning stability. Also, the copolymerization ratio is preferably 15 mol % or less, more preferably 10 mol % or less, and still more preferably 5 mol % or less to prevent a decrease in spinning stability and strength.

The Kinds of the α-olefins and the content of α-olefins in the polymerization components of the polypropylene-based resin can be determined, for example, from a detection peak position and a peak area ratio obtained by a nuclear magnetic resonance apparatus (NMR).

A melting point of the polypropylene-based resin is preferably 120 °C or higher and 180 °C or lower. When the melting point of the polypropylene-based resin is preferably 120 °C or higher, more preferably 130 °C or higher, and still more preferably 140 °C or higher, heat resistance that can be put to practical use is easily obtained. Also, when the melting point is preferably 180 °C or lower, more preferably 170 °C or lower, and still more preferably 160 °C or lower, yarns discharged from a spinning spinneret are easily cooled and bonding between fibers is suppressed, so that a spun-bonded nonwoven fabric with excellent uniformity of formation is obtained.

Further, the polyolefin-based resin in the present invention may be a mixture of two or more kinds thereof. In addition to the main polyolefin-based resin (refers to a polyolefin that accounts for the largest mass % in the polyolefin-based resin), a resin composition containing polyolefin-based resins such as polyethylene, polypropylene, and poly-4-methyl-1-pentene and thermoplastic resins such as a thermoplastic elastomer, a low melting point polyester, and a low melting point polyamide can also be used. However, in order to sufficiently express the properties of the main polyolefin-based resin, the ratio of other thermoplastic resins to be mixed is preferably 20 mass % or less, more preferably 10% or less, and still more preferably 5 mass % or less.

In addition, additives such as an antioxidant, a weathering stabilizer, a light stabilizer, a heat stabilizer, an antistatic agent, a charge retention agent, an anti-fogging agent, an anti-blocking agent, a matting agent, an antibacterial agent, an antifungal agent, an anti-allergen agent, an antiviral agent, a vitamin agent, a flame retardant, a metal oxide, a hydrophilic agent, a nucleating agent, a pigment, a lubricant including polyethylene wax, and an aliphatic bisamide and/or an aliphatic monoamide, which are usually used, or other polymers can be added, as necessary, to the thermoplastic resin P2 as long as the effect of the present invention is not impaired.

The melt flow rate (hereinafter, may be abbreviated as MFR) of the thermoplastic resin P2 is preferably 1 g/10 min or more and 100 g/10 min or less. When the MFR of the thermoplastic resin P2 is preferably 1 g/10 min or more, more preferably 10 g/10 min or more, and still more preferably 20 g/10 min or more, yarn breakage during spinning in the production step which will be described later is suppressed, so that a spun-bonded nonwoven fabric having few surface defects is obtained. On the other hand, when the MFR of the thermoplastic resin P2 is preferably 100 g/10 min or less, more preferably 80 g/10 min or less, and still more preferably 60 g/10 min or less, the single yarn strength increases, so that a spun-bonded nonwoven fabric excellent in strength and rigidity is obtained. Certainly, the MFR of the polyolefin-based resin to be used in the present invention can also be adjusted by blending two or more resins having different MFRs at an any proportion.

As for the MFR of the thermoplastic resin P2, a value measured by ASTM D1238-10 "Standard Test Method for Melt Flow Rates of Thermoplastics by Extrusion Plastometer" (A method) is adopted. According to this standard, it is prescribed that polyethylene is measured at a load of 2.16 kg (≈21.2 N) and a temperature of 190 °C and polypropylene is measured at a load of 2.16 kg (≈21.2 N) and a temperature of 230 °C.

In addition, when the spun-bonded nonwoven fabric of the present invention contains preferably a hindered amine-based compound, more preferably a hindered amine-based compound represented by a general formula (1) for the thermoplastic resin P2, a spun-bonded nonwoven fabric having high chargeability and charge retention after the electret treatment as described later is performed is obtained. Such a spun-bonded nonwoven fabric can be a filter aggregate formed of the spun-bonded nonwoven fabric of the present invention functioning as a prefilter; the spun-bonded nonwoven fabric of the present invention also can be used alone as a coarse dust filter.

[Chem. 1]

General formula (1)

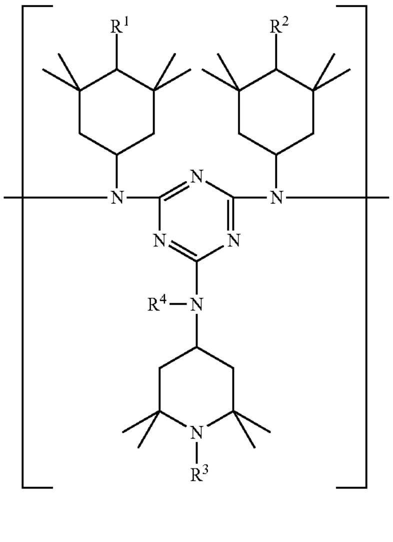

(Where $R^1$ to $R^3$ are hydrogen or an alkyl group having 1 or 2 carbon atoms, and $R^4$ is hydrogen or an alkyl group having 1 to 6 carbon atoms)

In this case, the content of the hindered amine-based compound with respect to the thermoplastic resin P2 is preferably 0.1 mass % or more and 5.0 mass % or less. When the content of the hindered amine-based compound is preferably 0.1 mass % or more, more preferably 0.3 mass % or more, and still more preferably 0.5 mass % or more, a spun-bonded nonwoven fabric excellent in chargeability and charge retention is obtained. On the other hand, when the content of the hindered amine-based compound is preferably 5.0 mass % or less, more preferably 4.0 mass % or less, and still more preferably 3.0 mass % or less, yarn breakage during spinning in the production step which will be described later is suppressed, so that a spun-bonded nonwoven fabric having few surface defects is obtained.

Examples of the hindered amine-based compound include poly[(6-(1,1,3,3-tetramethylbutyl)amino-1,3,5-triazine-2,4-diyl) ((2,2,6,6-tetramethyl-4-piperidyl)imino)hexamethylene ((2,2,6,6-tetramethyl-4-piperidyl)imino)]("Chimassorb" (registered trademark) 944LD manufactured by BASF Japan Ltd.), dimethyl-1-(2-hydroxyethyl) succinate-4-hydroxy-2,2,6,6-tetramethylpiperidin polycondensate ("Tinuvin" (registered trademark) 622LD manufactured by BASF Japan Ltd.), 2-(3,5-di-t-butyl-4-hydroxybenzyl)-2-n-butylmalonic acid bis(1,2,2,6,6-pentamethyl-4-piperidyl) ("Tinuvin" (registered trademark) 144 manufactured by BASF Japan Ltd.), and a polycondensate of dibutylamine 1,3,5-triazine N,N'-bis(2,2,6,6-tetramethyl-4-piperidyl-1,6-hexamethylenediamine N-(2,2,6,6-tetramethyl-4-piperidyl)butylamine ("Chimassorb" (registered trademark) 2020FDL manufactured by BASF Japan Ltd.).

Examples of the compound represented by the general formula (1) include poly[(6-(1,1,3,3-tetramethylbutyl) amino-1,3,5-triazine-2,4-diyl) ((2,2,6,6-tetramethyl-4-piperidyl)imino)hexamethylene ((2,2,6,6-tetramethyl-4-piperidyl)imino)]("Chimassorb" (registered trademark) 944LD manufactured by BASF Japan Ltd.) and a polycondensate of dibutylamine 1,3,5-triazine N,N'-bis(2,2,6,6-tetramethyl-4-piperidyl-1,6-hexamethylenediamine N-(2,2,6,6-tetramethyl-4-piperidine)butylamine ("Chimassorb" (registered trademark) 2020FDL manufactured by BASF Japan Ltd.). Certainly, a plurality of kinds of hindered amine-based compounds may be contained in combination.

Also, as the polyolefin-based resin, a resin containing a petroleum-derived component or a resin containing a biomass-derived component can be used, but a resin containing a biomass-derived component is preferable. In addition, an abundance ratio of the biomass-derived carbon is preferably 20% or more, more preferably 50% or more, and still more preferably 90% or more with respect to the total carbon constituting the polyolefin-based resin. By doing so, a spun-bonded nonwoven fabric with a low environmental impact is obtained.

In addition, the polyolefin-based resin of the present invention includes not only a polyolefin-based resin newly obtained by polymerizing a biomass-derived component but also a recycled polyolefin-based resin containing a biomass-derived polyolefin-based resin.

A proportion of biomass-derived carbon atoms is measured using the carbon-14 concentration measurement method by accelerator mass spectrometry (B method) described in ASTM D6866-22 "Standard Test Methods for Determining the Biobased Content of Solid, Liquid, and Gaseous Samples Using Radiocarbon Analysis". In this method, it is possible to know whether the component is biomass-derived or petroleum-derived from the radioisotope amount of carbon atoms. In a case where all the carbon atoms are biomass-derived, the proportion of biomass-derived carbon atoms is 100%.

[Composite Fiber]

The spun-bonded nonwoven fabric of the present invention is composed of composite fibers containing the polyester-based resin P1 and the thermoplastic resin P2 as constituent components, and at least a part of the surface of the composite fibers is the thermoplastic resin P2. By doing so, the composite fibers having both single yarn strength and thermal adhesiveness is formed, and a spun-bonded nonwoven fabric having sufficient strength and rigidity that can be put to practical use is obtained.

As a composite form of the composite fiber constituting the spun-bonded nonwoven fabric of the present invention, a composite form such as a concentric core-sheath, an eccentric core-sheath, and a sea-island can be used. Among them, the core-sheath composite form is a preferred aspect, and the concentric core-sheath composite form is a more preferred aspect, since the spinnability is excellent and the fibers can uniformly adhere to each other by the thermal adhesion.

As a cross-sectional shape of the composite fiber constituting the spun-bonded nonwoven fabric of the present invention, in addition to a round cross section, a flat cross section, and an irregular cross section such as a Y-shape or a C-shape may be adopted. Among these, a round cross section is a more preferred aspect because it provides excellent spinnability and allows obtaining composite fibers excellent in single yarn strength when spun at a high spinning speed. Although a hollow cross section can also be applied as the cross-sectional shape, a solid cross section is a preferred aspect because yarn breakage during spinning in a production step which will be described later is suppressed and a spun-bonded nonwoven fabric having few surface defects is obtained.

In addition, in the composite fibers of the present invention, at least some of contact points between the fibers have a micro bonding area having a length of 5 μm or more and 100 μm or less in the fiber axis direction. Having such a micro bonding area means that the composite fibers are not excessively formed into a film shape, and the spun-bonded nonwoven fabric that can secure a surface area corresponding to the shape of the composite fiber and is excellent in liquid retention of a functional agent is obtained.

The “micro bonding area” is a portion that is bonded to adjacent fibers in a portion (non-macro bonding area) other than a macro bonding area which will be described later, and the “contact points between fibers” includes, in addition to the micro bonding area, a portion where fibers are entangled with each other or a portion where fibers are merely in contact without being bonded.

The micro bonding area has a length of 5 μm or more and 100 μm or less in the fiber axis direction. When having such a micro bonding area, a spun-bonded nonwoven fabric with excellent strength and rigidity and with high air permeability is obtained.

In a case where the composite fibers have the micro bonding area, it can be confirmed by observing the composite fibers from a cross section of the spun-bonded nonwoven fabric using a microscope (for example, such as “VW-9000” manufactured by Keyence Corporation) or a scanning electron microscope (for example, such as “VHX-D500” manufactured by Keyence Corporation). In this case, in a case where the spun-bonded nonwoven fabric has the macro bonding area which will be described later, the micro bonding area is confirmed at the non-macro bonding area.

A proportion by number of the contact points having the micro bonding area is preferably 20% or more and 100% or less, more preferably 50% or more and 100% or less, and still more preferably 80% or more and 100% or less, with respect to the total number of contact points between fibers. As described above, when a proportion of the micro bonding area in the contact points between the fibers increases, a spun-bonded nonwoven fabric further excellent in strength and rigidity is obtained.

Note that, as for the proportion by number of the contact points having the micro bonding area, a value calculated according to procedures below is adopted.

(1) Five cross-sectional photographs of the spun-bonded nonwoven fabric in a transverse direction are taken in the same procedure as in the measurement of the average center-to-center distance (μm) of the nearest neighbor fibers which will be described later.

(2) The number of contact points between fibers in the cross-sectional photograph and the number of contact points having the micro bonding area are counted.

(3) The total number of the contact points having the micro bonding area in all the cross-sectional photographs is divided by the total number of the contacts between the fibers in all the cross-sectional photographs, expressed as a percentage, and rounded off to the nearest whole number to obtain the proportion by number of the contact points having the micro bonding area.

Also, the composite fibers constituting the spun-bonded nonwoven fabric of the present invention has an average single-fiber diameter of 15.0 μm or more and 40.0 μm or less. When the lower limit of the average single-fiber diameter range is 15.0 μm or more, preferably 20.0 μm or more, more preferably 22.0 μm or more, and still more preferably 24.0 μm or more, a spun-bonded nonwoven fabric having excellent air permeability is obtained. On the other hand, when the upper limit of the above-mentioned range is 40.0 μm or less, preferably 34.0 μm or less, more preferably 32.0 μm or less, and still more preferably 29.0 μm or less, the number of the micro bonding areas is large, so that a spun-bonded nonwoven fabric excellent in strength and rigidity is obtained.

As for the average single-fiber diameter (μm) of the composite fibers constituting the spun-bonded nonwoven fabric, the value calculated according to procedures below is adopted.

(1) Ten small piece samples (100×100 mm) are randomly collected from the spun-bonded nonwoven fabric.

(2) A surface photograph is taken with the microscope or the scanning electron microscope at the magnification of 300 times to 1000 times, and a width (a diameter) of each of 50 composite fibers in the non-bonding area in total, 5 fibers from each sample, is measured. In a case where the cross section of the composite fiber is irregular, a cross-sectional area of the section is measured, and a diameter of a perfect circle having the same cross-sectional area is determined. The non-bonding area is a portion where fibers are not bonded to each other or deformed.

(3) The average value of the diameters of the 50 fibers measured is rounded off to one decimal place to obtain the average single-fiber diameter (μm).

The average single-fiber diameter can be controlled by appropriately adjusting a volume ratio between the polyester-based resin P1 and the thermoplastic resin P2 of the composite fibers, and/or a spinning temperature, a discharge amount per single hole of the spinning spinneret, the spinning speed, and the like which will be described later.

In the composite fibers in the present invention, the volume ratio of the polyester-based resin P1 to the composite fiber is preferably 50 vol % or more and 90 vol % or less. When the volume ratio of a core component to the composite fiber is preferably 50 vol % or more, more preferably 60 vol % or more, and still more preferably 70 vol % or more, the single yarn strength is improved to obtain a spun-bonded nonwoven fabric having sufficient strength that can be put to practical use, and sticking to a thermal embossing roll or the like in the production step which will be described later is suppressed, so that a spun-bonded nonwoven fabric having few surface defects such as wrinkles and irregularities is obtained. On the other hand, when the volume ratio of the polyester-based resin P1 to the composite fibers is preferably 90 vol % or less, more preferably 80 vol % or less, and still more preferably 70 vol % or less, the thermoplastic resins P2 are firmly bonded to each other during thermal bonding, and a spun-bonded nonwoven fabric having sufficient strength and rigidity that can be put to practical use is obtained.

[Spun-Bonded Nonwoven Fabric]

The spun-bonded nonwoven fabric of the present invention is composed of the above-described composite fibers. The spun-bonded nonwoven fabric has an average center-to-center distance between the nearest neighbor fibers in a cross section in the transverse direction (hereinafter, may be simply abbreviated as an "average center-to-center distance between nearest neighbor fibers") of 50 μm or less. When the upper limit of the range of the average center-to-center distance between the nearest neighbor fibers is 50 μm or less, preferably 46 μm or less, and more preferably 42 μm or less, formation of a micro bonding area at contact points between fibers increases, so that a spun-bonded nonwoven fabric excellent in strength and rigidity is obtained. Furthermore, since the fiber density in the cross section of the spun-bonded nonwoven fabric varies, with areas of both coarse and dense fibers, the spun-bonded nonwoven fabric which is excellent in air permeability and excellent in liquid retention of a functional agent is obtained. On the other hand, when the lower limit of the range of the average center-to-center distance of the nearest neighbor fibers is the same value as a diameter of the composite fibers, but is preferably 30 μm or more, more preferably 34 μm or more, and still more preferably 38 μm or more, the fibers are suppressed from being excessively bonded, so that the formation of the spun-bonded nonwoven fabric is favorable, and the spun-bonded nonwoven fabric having small variations in strength and rigidity is obtained.

In the present invention, the average center-to-center distance between the nearest neighbor fibers in a cross section in the transverse direction of the spun-bonded nonwoven fabric refers to a value measured and calculated according to procedures below.

(1) Five small piece samples (100×100 mm) are randomly collected from the spun-bonded nonwoven fabric, and a cross-sectional sample in the transverse direction is cut out from each small piece sample. In this case, if the spun-bonded nonwoven fabric has a macro bonding area which will be described later, a cross-sectional sample is cut out so as to pass through the center of a portion (non-macro bonding area) other than the macro bonding area.

(2) For each small piece sample, a cross-sectional photograph at a magnification of 200 times to 500 times is taken using a microscope (for example, such as "VW-9000" manufactured by Keyence Corporation) or a scanning electron microscope (for example, such as "VHX-D500" manufactured by Keyence Corporation). In this case, the spun-bonded nonwoven fabric is photographed so that the entire thickness thereof is captured. Also, in a case where the spun-bonded nonwoven fabric has a macro bonding area which will be described later, a photograph is taken at the center between the macro bonding areas.

(3) For all the fiber cross-sections in the cross-sectional photograph, a center-to-center distance between a certain fiber (the fiber) and the nearest neighbor fiber (a fiber closest to the fiber) is measured. In a case where the cross section of the composite fiber is irregular, the measurement is performed using the center of a circumscribed perfect circle. In this case, if the spun-bonded nonwoven fabric has a macro bonding area which will be described later, 50 fibers are measured in the order of proximity to the center of the cross-sectional photograph.

(4) An arithmetic average value of the measured values (μm) of the center-to-center distances with the nearest neighbor fibers is calculated and rounded off to one decimal place to obtain the average center-to-center distance (μm) of the nearest neighbor fibers.

In addition, the average center-to-center distance of the nearest neighbor fibers in the cross section in the transverse direction of the spun-bonded nonwoven fabric can be controlled by appropriately adjusting the volume ratio between the polyester-based resin P1 and the thermoplastic resin P2 of the composite fibers, the average single-fiber diameter, the thickness, the apparent density, and/or the spinning speed, the shortest distance between macro bonding areas adjacent to each other, the condition of thermal bonding (such as a temperature and linear pressure), and the like which will be described later.

In the spun-bonded nonwoven fabric of the present invention, the proportion by number (hereinafter, may be simply abbreviated as a "proportion by number $R_1$ of neighboring composite fibers") of the composite fibers having the center-to-center distance between the nearest neighbor fibers in the cross section in the transverse direction of 15 μm or more and 40 μm or less is preferably 40% or more. When the lower limit of the range of the proportion by number $R_1$ of neighboring composite fibers is preferably 40% or more, more preferably 45% or more, and still more preferably 50% or more, the area of bonding at the contact points between the fibers increases, so that a spun-bonded nonwoven fabric excellent in strength and rigidity is obtained. Furthermore, since the fiber density in the cross section of the spun-bonded nonwoven fabric varies, with areas of both coarse and dense fibers, the spun-bonded nonwoven fabric which is excellent in air permeability and excellent in liquid retention of a functional agent is obtained. On the other hand, when the upper limit of the above range is preferably 80% or less, more preferably 75% or less, and still more preferably 70% or less, the fibers are suppressed from being excessively bonded, so that the formation of the spun-bonded nonwoven fabric is favorable, and the spun-bonded nonwoven fabric having small variations in strength and rigidity is obtained.

In the spun-bonded nonwoven fabric of the present invention, it is preferable that the proportion by number (hereinafter, may be simply abbreviated as a "proportion by number $R_2$ of neighboring composite fibers) of the composite fibers having the center-to-center distance between the nearest neighbor fibers in the cross section in the transverse direction of 35 μm or less is 30% or more and 70% or less while the above-mentioned range of the proportion by number $R_1$ of the neighboring composite fibers is satisfied. When the lower limit of the range of the proportion by number $R_2$ of the neighboring composite fibers is preferably 30% or more, more preferably 35% or more, and still more preferably 40% or more, the area of bonding at the contact points between the fibers increases, so that a spun-bonded nonwoven fabric excellent in strength and rigidity is obtained. Furthermore, since the fiber density in the cross section of the spun-bonded nonwoven fabric varies, with area of both coarse and dense fibers, the spun-bonded nonwoven fabric which is excellent in air permeability and excellent in liquid retention of a functional agent is obtained. On the other hand, by setting the upper limit of the above range to preferably 70% or less, more preferably 65% or less, and still more preferably 60% or less, the fibers are suppressed from being excessively bonded, so that the formation of the spun-bonded nonwoven fabric is favorable, and the spun-bonded nonwoven fabric having small variations in strength and rigidity is obtained.

The spun-bonded nonwoven fabric of the present invention preferably has regularly arranged macro bonding areas. Here, the "macro bonding area" refers to a portion where fibers are bonded to each other by being melted until the fiber cross-sectional shape is deformed to a degree different from the shape of other portions by being pressure-bonded in the cross-sectional direction of the spun-bonded nonwoven fabric, and furthermore, the portion becomes a lump or a film. Specifically, it is a portion thermocompression-bonded by a pair of thermal embossing rolls engraved on at least one roll surface, or a portion thermally bonded by ultrasonic vibration. In a case where sufficient heat is applied to the portion at the time of thermocompression bonding or thermal bonding, and the entire composite fibers of the portion is bonded, the shape and area of the pressure-bonded portion such as a thermal embossing roll used and the shape and area of the macro bonding area can be regarded as being the same. For example, in a case of thermocompression bonding by a thermal embossing roll, when thermal bonding is performed by a roll having a pair of protrusion and depression as described later, the shape and area of the macro bonding area are considered to be the same as the shape and area of a portion where a protrusion portion of an upper roll and a protrusion portion of a lower roll overlap and abut on the nonwoven fiber web. When thermal bonding is performed using a roll having protrusions and depressions and a flat roll as described later, the shape and area of the macro bonding area are considered to be the same as the shape and area of the portion where the protrusion portion of the roll having protrusions and depressions abuts on the nonwoven fiber web. The spun-bonded nonwoven fabric having the macro bonding area as described above is excellent in strength and rigidity.

In the present invention, "regularly arranged" means a state of being regularly present at constant intervals in each of the longitudinal direction and the transverse direction of the spun-bonded nonwoven fabric. By doing so, it is possible to reduce variations in the strength of the spun-bonded nonwoven fabric. Examples of a specific form of the arrangement include a form in which the centers of the macro bonding areas are arranged in a polygonal lattice shape, such as a triangular lattice, a quadrangular lattice composed of shapes such as rectangles, trapezoids, parallelograms, and rhombuses, and a hexagonal lattice, and naturally include lattices having equal lengths of one side of the lattice such as a square lattice, a regular triangular lattice, and a regular hexagonal lattice. In addition, the staggered arrangement is also included in the form of arrangement in a polygonal lattice shape.

In the spun-bonded nonwoven fabric of the present invention, the shape of the macro bonding area can be selected according to the application in which the spun-bonded nonwoven fabric is used, and examples thereof include a circle, an ellipse, a square, a rectangle, a parallelogram, a rhombus, a regular hexagon, and a regular octagon.

When the spun-bonded nonwoven fabric of the present invention has regularly arranged macro bonding areas, the shortest distance between macro bonding areas adjacent to each other is preferably 0.5 mm or more and 2.0 mm or less. When the lower limit of the shortest distance range between macro bonding areas adjacent to each other is preferably 0.5 mm or more, more preferably 0.7 mm or more, and still more preferably 0.9 mm or more, voids in the spun-bonded nonwoven fabric are secured, so that a spun-bonded nonwoven fabric having excellent air permeability and a large dust holding capacity is obtained. In addition, since the average center-to-center distance between the nearest neighbor fibers, the proportion by number $R_1$ of the neighboring composite fibers, and the proportion by number $R_2$ of the neighboring composite fibers can be easily adjusted, a spun-bonded nonwoven fabric having high strength and rigidity, excellent air permeability, and excellent liquid retention of a functional agent can be easily obtained. On the other hand, when the upper limit of the above range is preferably 2.0 mm or less, more preferably 1.8 mm or less, and still more preferably 1.6 mm or less, the composite fibers are efficiently gripped by the macro bonding area, so that a spun-bonded nonwoven fabric excellent in strength and rigidity is obtained.

As for the shortest distance between the adjacent macro bonding areas, a value measured and calculated according to procedures below is adopted.

(1) Five small piece samples (100×100 mm) are randomly collected from the spun-bonded nonwoven fabric.

(2) For each small piece sample, a surface photograph at a magnification of 20 times to 300 times is taken using a microscope (for example, such as "VW-9000" manufactured by Keyence Corporation) or a scanning electron microscope (for example, such as "VHX-D500" manufactured by Keyence Corporation) such that one or more repeating units of regularly arranged macro bonding areas are included.

(3) Three macro bonding areas are randomly selected from each photograph, and the shortest distance to the adjacent macro bonding areas is measured. In this case, the boundary line between the macro bonding area and the non-macro bonding area is set as the start point/end point of the distance. In addition, if there are a plurality of bonding areas around one macro bonding area, the distance to the closest macro bonding area is measured.

(4) The measured values of the shortest distances at 15 points are averaged and rounded off to one decimal place to obtain the shortest distance (mm) between macro bonding areas adjacent to each other.

When the spun-bonded nonwoven fabric of the present invention has regularly arranged macro bonding areas, the individual areas of the macro bonding areas are preferably 0.10 $mm^2$ or more and 1.00 $mm^2$ or less. When the lower limit of the individual areas range of the macro bonding areas is preferably 0.10 $mm^2$ or more, more preferably 0.15 $mm^2$ or more, and still more preferably 0.20 $mm^2$ or more, the composite fibers are firmly bonded to each other by the macro bonding areas, so that a spun-bonded nonwoven fabric excellent in strength and rigidity is obtained. On the other hand, when the upper limit of the above range is preferably 1.00 $mm^2$ or less, more preferably 0.70 $mm^2$ or less, and still more preferably 0.40 $mm^2$ or less, voids in the spun-bonded nonwoven fabric are secured, so that a spun-bonded nonwoven fabric having excellent air permeability and a large dust holding capacity is obtained.

In the present invention, as for the area of each of the macro bonding areas, a value measured and calculated according to procedures below is adopted.

(1) Five small piece samples (100×100 mm) are randomly collected from the spun-bonded nonwoven fabric.

(2) For each small piece sample, a surface photograph at a magnification of 20 times to 300 times is taken using a microscope (for example, such as "VW-9000" manufactured by Keyence Corporation) or a scanning electron microscope (for example, such as "VHX-D500" manufactured by Keyence Corporation) such that one or more repeating units of regularly arranged macro bonding areas are included.

(3) Three macro bonding areas are randomly selected from each photograph, and areas thereof are measured. An arithmetic average value of the areas ($mm^2$) of a total of 15 points is calculated and rounded off to two decimal places to obtain the individual area ($mm^2$) of the macro bonding area.

In a case where the spun-bonded nonwoven fabric of the present invention has regularly arranged macro bonding areas, the proportion (hereinafter, may be simply abbreviated as an area ratio of a macro bonding area) of a total area of the macro bonding areas in the surface of the spun-bonded nonwoven fabric is preferably 5% or more and 30% or less. When the lower limit of the area ratio range of macro bonding areas is 5% or more, more preferably 8% or more, and still more preferably 10% or more, the spun-bonded nonwoven fabric excellent in strength is obtained. On the other hand, when the upper limit of the above range is preferably 30% or less, more preferably 20% or less, and still more preferably 15% or less, a spun-bonded nonwoven fabric having air permeability that can be put to practical use as a filter aggregate is obtained.

As for the area ratio of macro bonding areas adjacent to each other, a value measured and calculated according to procedures below is adopted.

(1) Five small piece samples (100×100 mm) are randomly collected from the spun-bonded nonwoven fabric.

(2) For each small piece sample, using a microscope (for example, such as "VW-9000" manufactured by Keyence Corporation) or a scanning electron microscope (for example, such as "VHX-D500" manufactured by Keyence Corporation), an area (S1) of repeating units of the arrangement of the macro bonding area and an area (S2) of the macro bonding area included in the repeating unit are measured at five points, and S2 is divided by S1 to calculate an area ratio (%).

(3) The area ratios (%) of a total of 25 points are averaged and rounded off to the nearest whole number to obtain the area ratio of macro bonding areas (%).

The spun-bonded nonwoven fabric of the present invention preferably has an apparent specific surface area of 980 $cm^2/g$ or more. When the lower limit of the apparent specific surface area range is preferably 980 $cm^2/g$ or more, more preferably 1000 $cm^2/g$ or more, and still more preferably 1100 $cm^2/g$ or more, a spun-bonded nonwoven fabric capable of more sufficiently exhibiting the effect of functional processing such as antimicrobial/antiviral processing while having high rigidity suitable for use as a filter aggregate is obtained. On the other hand, the upper limit of the above range is not particularly limited, but is preferably 1400 $cm^2/g$ or less, more preferably 1300 $cm^2/g$ or less, and still more preferably 1200 $cm^2/g$ or less from the viewpoint of imparting high air permeability suitable for use as a filter aggregate.

In the present invention, as for the apparent specific surface area, a value calculated using the following formula from the average single-fiber diameter (μm) of the composite fibers and the solid density ($g/cm^3$) measured and calculated according to procedures of (1) to (4) below is adopted.

$$\text{Apparent specific surface area } (cm^2/g) = 4\times10^4/[\text{average single-fiber diameter } (\mu m)]/[\text{solid density}(g/cm^3)]$$

(Method for Measuring and Calculating Solid Density)

(1) Five small pieces are randomly collected from the spun-bonded nonwoven fabric.

(2) The small pieces of (1) are immersed in the ethanol, washed, and dried in the atmosphere.

(3) A density ($g/cm^3$) of the small pieces of (2) is determined through a sink-float method by using a water-ethanol mixed liquid system.

(4) A similar measurement is performed on the five small pieces, and an arithmetic average value of the values ($g/cm^3$) of measured densities is calculated and rounded off to three decimal places to obtain the solid density ($g/cm^3$) of the composite fibers.

Also, the apparent specific surface area can be controlled by appropriately adjusting the volume ratio between the polyester-based resin P1 and the thermoplastic resin P2 and the average single-fiber diameter of the composite fibers.

The basis weight of the spun-bonded nonwoven fabric of the present invention is preferably 30 $g/m^2$ or more and 100 $g/m^2$ or less. When the lower limit of the basis weight range of the spun-bonded nonwoven fabric is preferably 30 $g/m^2$ or more, more preferably 40 $g/m^2$ or more, and still more preferably 50 $g/m^2$ or more, a spun-bonded nonwoven fabric having the sufficient strength and rigidity that can be put to practical use is obtained. On the other hand, when the upper limit of the above range is preferably 100 $g/m^2$ or less, more preferably 80 $g/m^2$ or less, and still more preferably 60 $g/m^2$ or less, a spun-bonded nonwoven fabric having sufficient air permeability that can be put to practical use and excellent pleating processability is obtained.

In the present invention, as for the basis weight of the spun-bonded nonwoven fabric, the value measured by procedures below in accordance with "6.2 Mass per unit area" in "Test methods for nonwovens" of JIS L 1913:2010 is adopted.

(1) Three test pieces of 20 cm×25 cm are collected per 1 m of width of a sample.

(2) The mass (g) of each of the test pieces in a standard state is measured.

(3) The average value of the mass is expressed as a mass per 1 $m^2$ ($g/m^2$).

Also, the basis weight can be controlled by appropriately adjusting a single hole discharge rate of the spinning spinneret, the speed of the net conveyor that collects the yarn, and the like.

Since the spun-bonded nonwoven fabric of the present invention is excellent in strength and rigidity, it is possible to reduce the basis weight as compared with the related art in use as a filter aggregate. As a result, the amount of plastic used for the filter aggregate can be reduced, and thus the environmental impact can be reduced.

The spun-bonded nonwoven fabric of the present invention preferably has a thickness of 0.20 mm or more and 0.60 mm or less. When the lower limit of the thickness range of the spun-bonded nonwoven fabric is preferably 0.20 mm or more, more preferably 0.25 mm or more, and still more preferably 0.30 mm or more, the spun-bonded nonwoven fabric having sufficient rigidity that can be put to practical use and having a sufficient dust holding capacity as a filter aggregate is obtained. On the other hand, when the upper limit of the above range is preferably 0.60 mm or less, more preferably 0.50 mm or less, and still more preferably 0.40 mm or less, the number of folds can be increased during pleating of the filter to increase a filtration area, so that a filter excellent in dust collection efficiency and having small pressure loss is obtained.

In the present invention, as for the thickness (mm) of the spun-bonded nonwoven fabric, a value measured by procedures below in accordance with "5.1" in "General Test Method for Long-Fiber nonwoven Fabric" of JIS L1906: 2000 is adopted.

(1) Thicknesses are measured at 10 points per 1 m at equal intervals in the width direction of the nonwoven fabric at a load of 10 kPa in a unit of 0.01 mm by using a pressurizer having a diameter of 10 mm.

(2) The average value of the 10 points is rounded off to two decimal places.

In addition, the thickness of the spun-bonded nonwoven fabric can be controlled by appropriately adjusting the volume ratio between the polyester-based resin P1 and the thermoplastic resin P2 of the composite fibers, the average single-fiber diameter, and/or the thermal adhesion conditions (for example, the shape of the macro bonding area, the shortest distance to adjacent macro bonding area, the pressure bonding rate, the temperature, and the linear pressure) which will be described later.

Further, an apparent density of the spun-bonded nonwoven fabric of the present invention is preferably 0.10 $g/cm^3$ to 0.25 $g/cm^3$. When the lower limit of the apparent density range of the spun-bonded nonwoven fabric is preferably 0.10 $g/cm^3$ or more, more preferably 0.13 $g/cm^3$ or more, and still more preferably 0.15 $g/cm^3$ or more, the number of contact points at which the micro bonding areas between the composite fibers are formed increases, so that the spun-bonded nonwoven fabric having sufficient strength and rigidity for practical use is obtained. On the other hand, when the apparent density is preferably 0.25 $g/cm^3$ or less, more preferably 0.22 $g/cm^3$ or less, and still more preferably 0.20 $g/cm^3$ or less, sufficient air permeability that can be put to practical use is secured, and at the time of performing functional processing, the chemical solution more easily permeates into the spun-bonded nonwoven fabric, so that the spun-bonded nonwoven fabric can easily exhibit functionality.

In the present invention, the apparent density ($g/cm^3$) is calculated based on an expression below from the basis weight and the thickness before the rounding described above, and is rounded off to two decimal places.

$$\text{Apparent density }(g/cm^3) = [\text{basis weight }(g/m^2)]/[\text{thickness (mm)}] \times 10^{-3}$$

The spun-bonded nonwoven fabric of the present invention preferably has a bending resistance in the longitudinal direction of 70 mg or more and 500 mg or less. When the lower limit of the bending resistance range of the spun-bonded nonwoven fabric in the longitudinal direction is preferably 70 mg or more, more preferably 85 mg or more, and still more preferably 100 mg or more, a spun-bonded nonwoven fabric having rigidity that can be put to practical use as a filter aggregate is obtained. On the other hand, when the bending resistance in the longitudinal direction is preferably 500 mg or less, more preferably 450 mg or less, and still more preferably 400 mg or less, it is possible to prevent quality defects such as creases during sheet conveyance and roll winding from occurring.

As for the bending resistance in the longitudinal direction of the spun-bonded nonwoven fabric of the present invention, a value measured in accordance with a method described in "6.7.4 Gurley method" in "6.7 Bending resistance (JIS method and ISO method)" in "Test methods for nonwovens" of JIS L 1913:2010 is adopted.

In addition, the bending resistance in the longitudinal direction of the spun-bonded nonwoven fabric can be controlled by appropriately adjusting the volume ratio between the polyester-based resin P1 and the thermoplastic resin P2 of the composite fibers, the average single-fiber diameter, the thickness, the apparent density, and/or the spinning speed, the thermal adhesion conditions (for example, the shape of the macro bonding area, the shortest distance to adjacent macro bonding area, the pressure bonding rate, the temperature, and the linear pressure) which will be described later.

The spun-bonded nonwoven fabric of the present invention preferably has a stress at 5% elongation in the longitudinal direction of 80 N/5 cm or more and 500 N/5 cm or less. When the lower limit of the stress range at 5% elongation in the longitudinal direction of the spun-bonded nonwoven fabric is preferably 80 N/5 cm or more, more preferably 100 N/5 cm or more, and still more preferably 120 N/5 cm or more, elongation due to tension at the time of filter processing is suppressed, so that not only the filter aggregate can be stably produced at a high yield but also deformation thereof is suppressed at the time of using the filter, and an increase in pressure loss of the filter can be prevented. On the other hand, when the upper limit of the above range is preferably 500 N/5 cm or less, more preferably 450 N/5 cm or less, and still more preferably 400 N/5 cm or less, a spun-bonded nonwoven fabric excellent in tear strength is obtained.

Note that, in the present invention, as for the stress at 5% elongation of the spun-bonded nonwoven fabric in the longitudinal direction, a value measured by procedures below in accordance with "6.3 Tensile strength and elongation rate (ISO method)" in "Test methods for nonwovens" of JIS L 1913:2010 is adopted.

(1) Three test pieces of 50 mm×200 mm are taken per 1 m of the width of the spun-bonded nonwoven fabric, with the long side aligned in the longitudinal direction of the spun-bonded nonwoven fabric.

(2) The test piece is set in a tensile tester (for example, TENSILON universal testing machine "RTG-1250" manufactured by A & D Company, Limited.) at a grip interval of 200 mm.

(3) The tensile test is performed at the tensile speed of 100 mm/min, and a stress at 5% elongation (a stress at 5% elongation) is measured.

(4) The average value of the stress at 5% elongation measured for each test piece is obtained and rounded off to two decimal places.

In addition, the stress at 5% elongation in the longitudinal direction of the spun-bonded nonwoven fabric can be controlled by appropriately adjusting the volume ratio between the polyester-based resin P1 and the thermoplastic resin P2 of the composite fibers, the average single-fiber diameter, the thickness, the apparent density, and/or the spinning speed, the thermal adhesion conditions (for example, the shape of the macro bonding area, the shortest distance to adjacent macro bonding area, the pressure bonding rate, the temperature, and the linear pressure) which will be described later.

The air permeability of the spun-bonded nonwoven fabric of the present invention is preferably 200 $cm^3/(cm^2\cdot sec)$ or more and 700 $cm^3/(cm^2\cdot sec)$ or less. When the lower limit of the air permeability range of the spun-bonded nonwoven fabric is preferably 200 $cm^3/(cm^2\cdot sec)$ or more, more preferably 300 $cm^3/(cm^2\cdot sec)$ or more, and still more preferably 400 $cm^3/(cm^2\cdot sec)$ or more, a spun-bonded nonwoven fabric having sufficient air permeability for use as a filter aggregate is obtained. On the other hand, when the upper limit of the above range is preferably 700 $cm^3/(cm^2\cdot sec)$ or less, more preferably 600 $cm^3/(cm^2\cdot sec)$, and still more preferably 500 $cm^3/(cm^2\cdot sec)$, a spun-bonded nonwoven fabric having strength and rigidity is obtained.

In the present invention, the air permeability of the spun-bonded nonwoven fabric is a value rounded off to the nearest whole number of a value ($cm^3/(cm^2\cdot sec)$) measured by an air permeability tester (for example, such as "FX 3300 IV" manufactured by TEXTEST) according to "6.8.1 Frazier method" in "6.8 Air permeability (JIS method)" in JIS L 1913:2010 "Test methods for nonwovens".

The air permeability of the spun-bonded nonwoven fabric can be controlled by appropriately adjusting the average single-fiber diameter, the thickness, the apparent density, and/or the conditions of thermal bonding (for example, the shape of the macro bonding area, the shortest distance to adjacent macro bonding area, the pressure bonding rate, the temperature, and the linear pressure) which will be described later.

It is also one of aspects that the spun-bonded nonwoven fabric of the present invention contains a functional agent. The spun-bonded nonwoven fabric of the present invention is excellent in liquid retention when a functional agent is imparted, and has a large effective area contributing to expression of its function. Therefore, the effect of the provided functional agent can be significantly enhanced. Specific examples thereof include those in which a thin film of a functional agent is attached to the fiber surface (coated with a functional agent), those in which particles of a functional agent are attached to the fiber surface, and those in which a functional agent added to a fiber is exposed to the fiber surface.

Examples of the functional agent include an antistatic agent, an antibacterial agent, an antifungal agent, an anti-allergen agent, an antiviral agent, a vitamin agent, a flame retardant, a hydrophilic agent, a water repellent agent, and an oil repellent agent. Among them, an antibacterial agent, an antifungal agent, and an antiviral agent are preferable. Specific examples of these functional agents are further shown below.

First, as the antimicrobial agent, an oxide of a metal element selected from copper, cobalt, aluminum, nickel, zinc, palladium, molybdenum, tungsten, and the like is preferable because it has little influence on the quality of the nonwoven fabric and is excellent in stability in a high-temperature environment. Among them, an oxide of zinc is more preferable because of excellent antibacterial performance. Also, a metallic oxide including oxides of a plurality of metal elements may be used.

That is, specific examples of the metal oxide include copper(I) oxide, copper(II) oxide, cobalt(II) oxide, cobalt (III) oxide, cobalt(II,III) oxide, aluminum(III) oxide, nickel (II) oxide, zinc(II) oxide, palladium(II) oxide, molybdenum (VI) oxide, and tungsten(VI) oxide, and zinc(II) oxide is preferred.

The metal oxide is preferably a particle, and the average particle diameter of the particle is preferably 1000 nm or less. Here, in the present invention, the average particle size of the metal oxide particles is measured and calculated by a method which will be described later, and refers to a primary particle size. When the upper limit of the average particle diameter range of the metal oxide particles is preferably 1000 nm or less, more preferably 500 nm or less, and still more preferably 300 nm or less, the metal oxide particles are likely to be uniformly and finely dispersed on the fiber surface constituting the spun-bonded nonwoven fabric, so that the spun-bonded nonwoven fabric having excellent antibacterial performance is obtained. On the other hand, although there is no particular lower limit for the above range, in general, it is preferable to use particles of 100 nm or more from the viewpoint of handling nanomaterials.

The average particle size of the metal oxide particles is a value measured and calculated according to the following method.

(1) Ten small piece samples (100×100 mm) are randomly collected from the spun-bonded nonwoven fabric.

(2) Using a scanning electron microscope (SEM, for example, "VHX-D500" manufactured by Keyence Corporation, and the like) or a transmission electron microscope (TEM, for example, "JEM-F200" manufactured by JEOL Ltd.), a photograph is taken at a magnification of 1000 to 100,000 times so that the metal oxide particles can be observed, the projected area ($nm^2$) of a total of 50 metal oxide particles is measured for 5 particles from each sample, and the diameter (nm) of a perfect circle having the same cross-sectional area is determined.

(3) The measured 50 diameter values are averaged and rounded off to the nearest whole number to obtain the average particle diameter (nm) of the metal oxide particles.

The content ratio of the metal oxide particles is preferably 0.01 mass % or more and 5.00 mass % or less with respect to the mass of the spun-bonded nonwoven fabric. When the lower limit of the content ratio range of the metal oxide particles is preferably 0.01 mass % or more, more preferably 0.10 mass % or more, and still more preferably 0.30 mass % or more, a spun-bonded nonwoven fabric having excellent antibacterial performance is obtained. On the other hand, when the upper limit of the above range is preferably 5 mass % or less, more preferably 3 mass % or less, and still more preferably 1 mass % or less, in the production of the spun-bonded nonwoven fabric, the occurrence of yarn breakage is suppressed when the metal oxide particles are added to the polyester-based resin P1 and/or the thermoplastic resin P2 constituting the spun-bonded nonwoven fabric of the present invention, so that the spun-bonded nonwoven fabric having excellent surface quality is obtained.

The antifungal agent is preferably an organic compound containing at least one of a nitrogen-containing heterocyclic ring and a sulfur atom, and is preferably a particulate substance. Specific examples thereof include organic antibacterial antifungal agents such as a benzimidazole compound, a pyrithione compound, and an isothiazoline compound, and among them, a combination of a pyrithione compound and a benzimidazole compound is preferable. In addition, examples include an iodo antifungal agent, and among them, diiodomethyl-p-trissulfone, 3-iodo-2 propynyl butyl carbamate, and the like are exemplified.

The content proportion of the antifungal agent is preferably 0.01 mass % or more and 5.00 mass % or less with respect to the mass of the spun-bonded nonwoven fabric. When the lower limit of the content ratio range of the antifungal agent is preferably 0.01 mass % or more, more preferably 0.10 mass % or more, and still more preferably 0.30 mass % or more, a spun-bonded nonwoven fabric having excellent antifungal performance is obtained. On the other hand, when the upper limit of the range is preferably 5.00 mass % or less, more preferably 3.00 mass % or less, and still more preferably 1.00 mass % or less, the occurrence of yarn breakage during the production of the spun-bonded nonwoven fabric is suppressed in a case where particles of the antifungal agent are added to the polyester-based resin P1 and/or the thermoplastic resin P2 constituting the spun-bonded nonwoven fabric of the present invention, so that the spun-bonded nonwoven fabric excellent in surface quality is obtained.

Examples of the antiviral agent include iodides of elements in the 4th to 6th periods and Groups 8 to 15 of the periodic table such as copper, silver, antimony, iridium, germanium, tin, thallium, platinum, palladium, bismuth, gold, iron, cobalt, nickel, zinc, indium, and lead, copper compounds such as monovalent copper chlorides, acetic acid compounds, sulfides, iodides, bromides, peroxides, oxides, and thiocyanides, and surfactants.

Examples of the antiviral agent containing an iodide include copper(I) iodide, silver(I) iodide, antimony(III) iodide, iridium(IV) iodide, germanium(II) iodide, germanium(IV) iodide, tin(II) iodide, tin(IV) iodide, thallium(I) iodide, platinum(II) iodide, platinum(IV) iodide, palladium (II) iodide, bismuth(III) iodide, gold(I) iodide, gold(III) iodide, iron(II) iodide, cobalt(II) iodide, nickel(II) iodide, zinc(II) iodide, indium(III) iodide, and lead(I) iodide. Among them, copper(I) iodide and silver(I) iodide are preferably used because they have sufficient antiviral performance, can be kneaded into the polyester-based resin P1 and the thermoplastic resin P2, and are also excellent in spinnability.

Examples of the antiviral agent containing a surfactant include a quaternary cationic surfactant, a quaternary cationic polymer, and a sulfonic acid surfactant. As the quaternary cationic surfactant, a quaternary ammonium salt is preferably used because it has sufficient antiviral performance and excellent coatability on the fiber surface.

The content proportion of the antiviral agent is preferably 0.01 mass % or more and 5.00 mass % or less with respect to the mass of the spun-bonded nonwoven fabric. When the lower limit of the content ratio range of the antiviral agent is preferably 0.01 mass % or more, more preferably 0.10 mass % or more, and still more preferably 0.30 mass % or more, a spun-bonded nonwoven fabric having excellent antiviral performance is obtained. On the other hand, when the upper limit of the range is preferably 5.00 mass % or less, more preferably 3.00 mass % or less, and still more preferably 1.00 mass % or less, the occurrence of yarn breakage during the production of the spun-bonded nonwoven fabric is suppressed in a case where particles of the antiviral agent are added to the polyester-based resin P1 and/or the thermoplastic resin P2 constituting the spun-bonded nonwoven fabric of the present invention, so that the spun-bonded nonwoven fabric excellent in surface quality is obtained.

[Method for Producing Spun-Bonded Nonwoven Fabric]

Next, a preferred aspect of the method for producing the spun-bonded nonwoven fabric of the present invention will be specifically described.

The spun-bonded nonwoven fabric of the present invention is a long-fiber nonwoven fabric produced by a spunbond method. The spun-bonding method is excellent in productivity and mechanical strength, and can suppress fluffing and falling of the fiber, which are likely to occur in a short-fiber nonwoven fabric. In addition, stacking a plurality of layers of the spun-bonded nonwoven fiber web formed by collecting long fibers or the spun-bonded nonwoven fabric obtained by thermocompression-bonding the spun-bonded nonwoven fiber web (in both cases, a single layer is denoted as S) as SS, SSS, and SSSS improves productivity and formation uniformity, which is a preferred aspect.

In the spun-bonding method, first, a molten thermoplastic resin is spun as long fibers from a spinning spinneret, and the long fibers are sucked and stretched by compressed air using an ejector (air sucker), and then the fibers are collected on a moving net to obtain a spun-bonded nonwoven fiber web (hereinafter, may be simply referred to as a "nonwoven fiber web"). Moreover, the obtained nonwoven fiber web is subjected to a thermal adhesion treatment to obtain the spun-bonded nonwoven fabric.

A shape of the spinning spinneret or the ejector is not particularly limited, but for example, various shapes such as a round shape and a rectangular shape can be adopted. Among the shapes, a combination of a rectangular spinneret and a rectangular ejector is preferably used, since an amount of the compressed air used is relatively small, energy cost is low, bonding and scraping of the yarns hardly occurs, and opening of the yarns is easy.

In the present invention, the polyester-based resin P1 and the thermoplastic resin P2 are melted in different extruders, weighed, supplied to one spinning spinneret, and spun as composite fibers. The spinning temperature in spinning the composite fibers is preferably 200 °C or higher and 320 °C or lower, more preferably 240 °C or higher and 300 °C or lower, and still more preferably 270 °C or higher and 290 °C or lower. By setting the spinning temperature within the above range, a stable molten state can be obtained while suppressing thermal deterioration of the polyester-based resin P1 and the thermoplastic resin P2, and excellent stringiness can be obtained.

The spun long fiber yarns are then cooled. Examples of the method for cooling the spun yarns include a method in which cold air is forcibly blown to the yarns, a method in which the yarns are naturally cooled at an ambient temperature around the yarns, and a method in which a distance between the spinning spinneret and the ejector is adjusted, or a method in which these methods are combined can be adopted. Further, cooling conditions can be appropriately adjusted and adopted in consideration of, for example, a discharge amount of the spinning spinneret per single hole, the spinning temperature, and the ambient temperature.

Next, the yarns cooled and solidified are pulled and stretched by the compressed air ejected from the ejector.

The spinning speed is preferably 4000 m/min or more and 7000 m/min or less, more preferably 4500 m/min or more and 6500 m/min or less, and still more preferably 5000 m/min or more and 6000 m/min or less. By setting the spinning speed to 4000 m/min or more and 7000 m/min or less, not only high productivity is obtained, but also orientation crystallization of fibers can be promoted, so that long fibers having high strength can be obtained. The spinning speed can be controlled by appropriately adjusting the spinning temperature, the discharge amount per single hole of the spinning spinneret, the distance between the spinning spinneret and the ejector, the condition of cooling the spun yarn (such as temperature of cold air and air volume), and the like.

Subsequently, the obtained long fibers are collected on the moving net to form the nonwoven fiber web.

In the present invention, it is also a preferred aspect that a thermal flat roll is brought into contact with the nonwoven fiber web from one side thereof on the net to be temporarily bonded. Accordingly, it is possible to prevent the surface layer of the nonwoven fiber web from being turned over or blown off during conveyance on the net resulting in the deterioration of the formation, and to improve a conveyance ability from yarns collection to thermocompression bonding.

Subsequently, it is preferable to form regularly arranged macro bonding areas by thermally bonding the obtained nonwoven fiber web as necessary. The method for thermally bonding the nonwoven fiber web is not particularly limited, and examples thereof include a thermal bonding method using various rolls such as a pair of thermal embossing rolls in which at least one roll surface is engraved (that is, a pair of thermal embossing rolls with engravings (protrusion and depression portions) on each roll surface, and a pair of thermal embossing rolls configured of a combination of a roll having a flat (smooth) roll surface and a roll with engravings (protrusion and depression portions) on a roll surface) and a pair of thermal calender rolls in which roll surfaces are both flat (smooth), and a thermal bonding method using ultrasonic vibration of a horn. Among them, it is preferable to use a pair of thermal embossing rolls in which at least one roll surface is engraved. By doing so, it is possible to improve productivity, and provide regularly arranged macro bonding areas that improve strength of the spun-bonded nonwoven fabric.

As the thermal embossing roll, a pair of rolls whose surface material is metal is a preferred aspect to obtain a sufficient thermocompression bonding effect and prevent the engraving (protrusion and depression portions) of one embossing roll from being transferred to the other roll surface.

The shape of crimped portion, that is, the macro bonding area, by thermal embossing rolls or the like can be selected according to the application in which the spun-bonded nonwoven fabric is used, and examples thereof include a circle, an ellipse, a square, a rectangle, a parallelogram, a rhombus, a regular hexagon, a regular octagon, and the like.

In order to allow the macro bonding areas to regularly exist at constant intervals in each of the longitudinal direction and the transverse direction of the spun-bonded nonwoven fabric, it is preferable that the centers of the bonding areas are regularly arranged as in the form exemplified above. Accordingly, it is possible to reduce variations in the strength and anisotropy of the spun-bonded nonwoven fabric.

As described above, in the case of forming regularly arranged macro bonding areas, the shortest distance between adjacent crimped portions is preferably 0.5 mm or more and 2.0 mm or less. By setting the lower limit of a range of the shortest distance between the adjacent crimped portions to preferably 0.5 mm or more, more preferably 0.7 mm or more, and still more preferably 0.9 mm or more, voids in the spun-bonded nonwoven fabric are secured, so that the spun-bonded nonwoven fabric having excellent air permeability and a large dust holding capacity can be obtained. In addition, since the average center-to-center distance between the nearest neighbor fibers, the proportion by number $R_1$ of the neighboring composite fibers, and the proportion by number $R_2$ of the neighboring composite fibers can be easily adjusted, a spun-bonded nonwoven fabric having high strength and rigidity, excellent air permeability, and excellent liquid retention of the functional agent can be easily obtained. On the other hand, by setting the upper limit of the range to preferably 2.0 mm or less, more preferably 1.8 mm or less, and still more preferably 1.6 mm or less, the composite fibers can be efficiently gripped by the macro bonding areas, so that a spun-bonded nonwoven fabric excellent in strength and rigidity can be obtained.

As described above, in a preferred aspect, the surface temperature of the thermal embossing roll in the case of forming the regularly arranged macro bonding areas is from a temperature 30 °C lower to a temperature 10 °C higher than the melting point (hereinafter, may be denoted as Tm (°C)) of the thermoplastic resin P2 being used (that is, (Tm−30 °C) to (Tm+10 °C)). By setting the surface temperature of the heat roll to preferably −30 °C (that is, (Tm−30 °C), and the same applies hereinafter) or higher, more preferably −20 °C (Tm−20 °C) or higher, and still more preferably −10 °C (Tm−10 °C) or higher relative to the melting point of the thermoplastic resin P2, a spun-bonded nonwoven fabric that is firmly thermal-bonded and has strength that can be put to practical use can be obtained. In addition, by setting the surface temperature of the thermal embossing roll to preferably +10 °C (Tm+10 °C) or lower, more preferably +5 °C (Tm+5 °C) or lower, and still more preferably +0 °C (Tm+0 °C) or lower relative to the melting point of the thermoplastic resin P2, it is possible to suppress a decrease in tear strength due to excessive thermal bonding and to prevent the occurrence of a defect that the spun-bonded nonwoven fabric sticks to the heat roll during thermal bonding.

The linear pressure of the thermal embossing roll during thermal bonding is preferably 50 N/cm or more and 500 N/cm or less. By setting the linear pressure of the roll to preferably 50 N/cm or more, more preferably 100 N/cm or more, and still more preferably 150 N/cm or more, a spun-bonded nonwoven fabric that is firmly thermal-bonded and has strength that can be put to practical use can be obtained. On the other hand, by setting the linear pressure of the thermal embossing roll to preferably 500 N/cm or less, more preferably 400 N/cm or less, further preferably 300 N/cm or less, it is possible to suppress a decrease in tear strength due to excessive thermal bonding.

In the present invention, thermocompression bonding is preferably performed using a thermal calender roll composed of a pair of upper and lower flat rolls, before and/or after heat bonding using the thermal embossing roll for the purpose of adjusting the thickness of the spun-bonded nonwoven fabric. The pair of upper and lower flat rolls is metal rolls or elastic rolls with no protrusion or depression portions on the surfaces of the rolls, and one metal roll and another metal roll can used in pair, or one metal roll and another elastic roll can be used in pair.

Here, the elastic roll referred to is a roll made of an elastic material, in contrast to the metal roll. Examples of the elastic roll include a so-called paper roll such as paper, cotton paper, and aramid paper, and a resin roll made of a urethane-based resin, an epoxy-based resin, a silicon-based resin, a polyester-based resin, hard rubber, and a mixture thereof.

Subsequently, the surface of the composite fibers is softened or melted by penetrating hot air through the nonwoven fiber web provided with the macro bonding areas as necessary to thermally bond the fiber contact points to each other, thereby obtaining a spun-bonded nonwoven fabric having a micro bonding areas. In addition, this step may be performed on a nonwoven fiber web to which a macro bonding areas are not provided, and in this case, the macro bonding areas may be provided after the micro bonding areas are provided.

In a preferred aspect, the temperature of the hot air to be penetrated through the nonwoven fiber web is from a temperature 20 °C lower to a temperature 20 °C higher (that is, (Tm−20 °C) to (Tm+20 °C)) than the melting point (Tm (°C)) of the thermoplastic resin P2 being used. By setting the temperature of the hot air to preferably −20 °C (that is, (Tm−20 °C) or higher, and the same applies hereinafter), more preferably −10 °C (Tm−10 °C) or higher, and still more preferably +0 °C (Tm+0 °C) or higher relative to the melting point of the thermoplastic resin P2, it is possible to provide a spun-bonded nonwoven fabric that firmly thermally bonds the contact points between the composite fibers and is excellent in strength and rigidity. In addition, by setting the temperature of the hot air to preferably +20 °C (Tm+20 °C) or lower, more preferably +15 °C (Tm+15 °C) or lower, and still more preferably +10 °C (Tm+10 °C) or lower relative to the melting point of the thermoplastic resin P2, it is possible to prevent the nonwoven fiber web from partially melting or breaking due to excessive application of heat.

The time for penetrating hot air through the nonwoven fiber web is preferably 1 second to 20 seconds. By setting the time for penetrating the hot air to preferably 1 second or more, more preferably 3 seconds or more, and still more preferably 5 seconds or more, even in a portion where the basis weight is partially high and the hot air is difficult to penetrate, the contact points between the composite fibers can be firmly thermally bonded, and a spun-bonded nonwoven fabric excellent in strength and rigidity can be obtained. On the other hand, by setting the time for penetrating hot air to preferably 20 seconds or less, more preferably 15 seconds or less, and still more preferably 10 seconds or less, it is possible to prevent the nonwoven fiber web from partially melting or breaking due to excessive heat application.

The spun-bonded nonwoven fabric of the present invention is produced in this manner, but the spun-bonded nonwoven fabric may have the functional agent such as the antibacterial agent, the antifungal agent, the anti-allergen agent, the antiviral agent, the vitamin agent, or the flame retardant attached to the fiber surface by post-processing. In particular, when the spun-bonded nonwoven fabric of the present invention is used as a filter aggregate, the effect of imparting these functionalities can be significantly enhanced as compared with a conventional filter aggregate.

As a method for attaching the functional agent to the fiber surface, a coating method using a gravure roll, a kiss roll, or the like, an impregnation method, a spraying method, or the like is preferably used. In addition, it is preferable that the solvent for diluting the functional agent is water-based since it is excellent in safety and has a small load on the environment. Here, examples of the aqueous solvent include water alone, or an aqueous solution containing a water-soluble organic solvent such as lower alcohols such as methanol and ethanol, lower ketones such as acetone and methyl ethyl ketone, lower carboxylic acids such as an acetic acid, and glycols such as an ethylene glycol, a propylene glycol, and a diethylene glycol, and the aqueous solvent can be selected depending on the purpose.

In addition, the spun-bonded nonwoven fabric of the present invention is subjected to electret treatment to improve collection performance by utilizing electrostatic action in addition to physical action, and can have a function as a prefilter while being a filter aggregate, or can be used alone as a coarse dust filter.

The method of electret treatment is not particularly limited, but a corona charging method, a method of charging a nonwoven fabric sheet by applying water to the nonwoven fabric sheet and then drying the nonwoven fabric sheet (for example, methods described in Japanese Patent Application Laid-Open No. 9-501604, Japanese Patent Application Laid-Open No. 2002-249978, and the like), a thermal electret method, and the like are suitably used. In the case of the corona charging method, the electric field intensity is preferably 15 kV/cm or more, and more preferably 20 kV/cm. By doing so, charging can be enhanced, and collection performance by electrostatic action can be improved.

[Filter Medium, Air Filter]

The filter medium according to the present invention includes the spun-bonded nonwoven fabric. With such a configuration, it is possible to obtain a filter medium which is excellent in pleating property and shape retention, is excellent in air permeability, is suitable for imparting functionality, and can further reduce an environmental impact. It is also preferable that a filter medium layer responsible for dust removing performance and the like is bonded to the spun-bonded nonwoven fabric to form an air filter medium.

Examples of the method for obtaining the air filter medium include a method in which a filter medium layer responsible for dust removing performance and the like and the spun-bonded nonwoven fabric of the present invention are bonded to each other by spraying a moisture-curable urethane resin or the like by a spraying method, and a method in which a thermoplastic resin and a thermal bonding fiber serving as a filter medium layer are sprayed on the spun-bonded nonwoven fabric of the present invention and bonded to each other through a heat path. Furthermore, a method of forming a precursor of a filter medium layer, for example, an electret melt blown nonwoven fiber web, on a spun-bonded nonwoven fiber web which is a precursor of the spun-bonded nonwoven fabric of the present invention, and appropriately bonding the precursor is also preferable.

Examples of the filter medium layer include a melt blown nonwoven fabric obtained by a meltblowing method, a nanofiber nonwoven fabric obtained by an electrospinning method, a dry nonwoven fabric obtained by webbing short fibers by a card method or an air-laid method, and a wet nonwoven fabric obtained by dispersing short fibers in water and ploughing the dispersion on a net. Among them, a melt blown nonwoven fabric or a nanofiber nonwoven fabric is preferably used because of excellent dust removing performance. In addition, the filter medium layer may also be an electret melt blown nonwoven fabric or a nanofiber nonwoven fabric obtained by performing electret processing. By doing so, the dust removing performance can be further improved.

The filter medium of the present invention can be used as a filter unit by being incorporated in a sheet form into a frame. In the present invention, the air filter medium can also be used as a pleated filter unit set in a frame by performing pleating process by repeating mountain folding and valley folding.

[Apparatus for Producing Filter Medium]

Next, an apparatus for manufacturing an air filter medium in one step, the air filter medium including the spun-bonded nonwoven fabric and a melt blown nonwoven fabric as a filter medium layer responsible for dust removing performance, will be described.

As shown in, for example, FIG. 1, an apparatus for producing a filter medium of the present invention includes: a first web forming assembly 50 that forms the spun-bonded nonwoven fiber web described above; a second web forming assembly 60 that forms an electret melt blown nonwoven fiber web on the spun-bonded nonwoven fiber web to form a laminated web; a first thermal bonding assembly 70 that thermally bonds the laminated web to form a macro bonding area in the laminated web; and a second thermal bonding assembly 80 that causes hot air to penetrate the laminated web to form a micro bonding area in the spun-bonded nonwoven fiber web.

The first web forming assembly 50 includes a spinning spinneret 1 having a plurality of discharge holes for discharging two kinds of thermoplastic resins melted by an extruder as composite fibers, a drawing device such as an ejector 2 for sucking and stretching the spun composite fibers with compressed air, and a collecting device such as a collection net 3 for collecting the stretched composite fibers to form a spun-bonded nonwoven fiber web.

Figure 2:
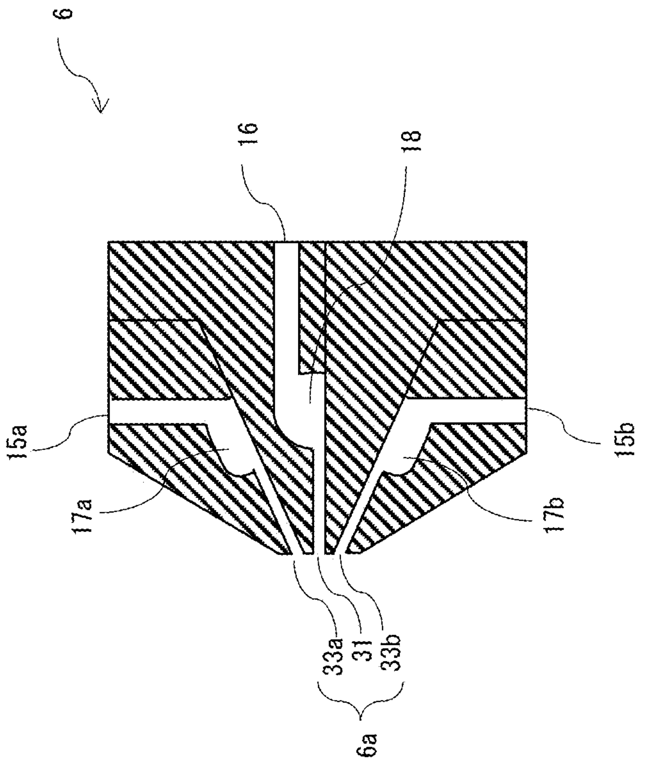
FIG. 2 is a cross-sectional view exemplifying and explaining a schematic structure of a spray nozzle at the center in a width direction.
Figure 3:
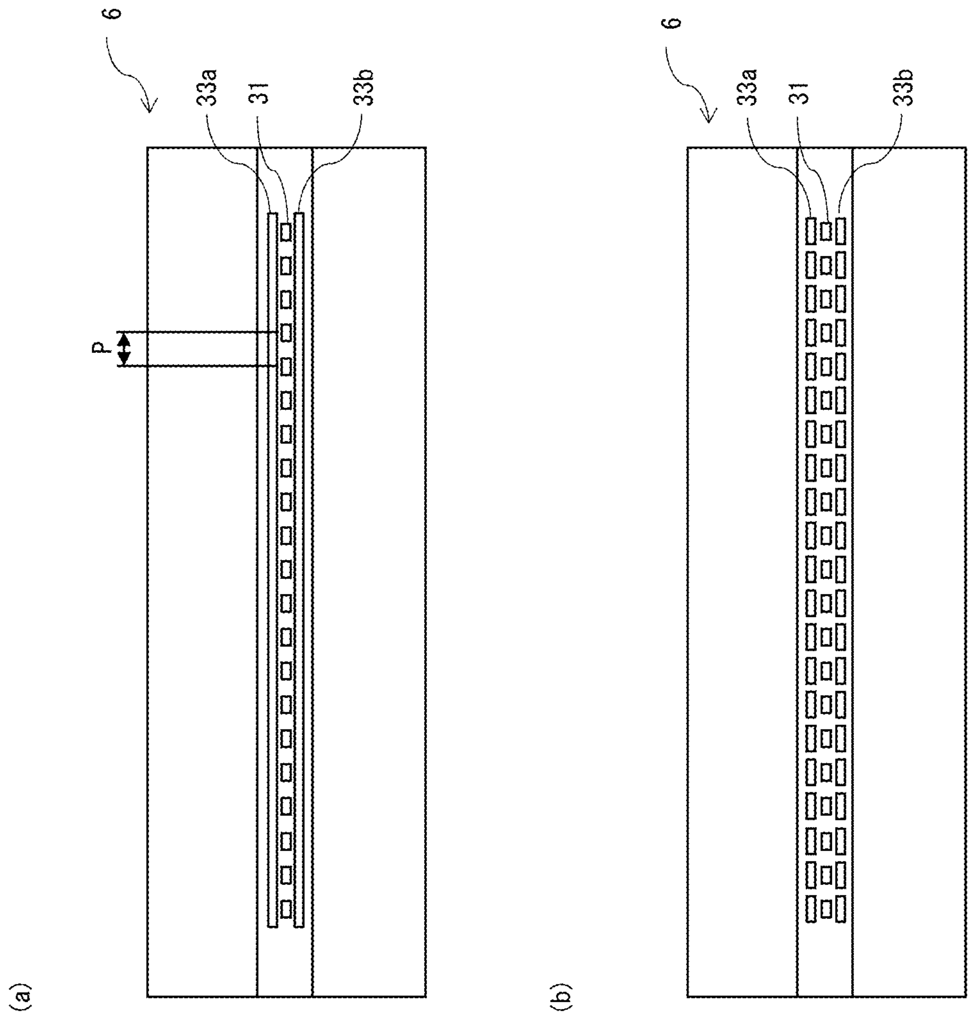
FIG. 3 is a front view exemplifying and explaining a configuration of a tip of a spray nozzle.

On the other hand, the second web forming assembly 60 includes a spinning spinneret 5 of a non-electroconductive polymer having a plurality of spinning holes in the width direction, and a water sprayer (a spray nozzle 6) for the spun yarn discharged from the spinning spinneret 5. As illustrated in FIGS. 2 and 3, the spray nozzle 6 includes a plurality of water discharge openings 31 arranged in the width direction, and a pair of air discharge openings 33*a* and 33*b* that are either continuously or intermittently opened over the width direction and are arranged so as to sandwich the water discharge openings, and is configured to cause air discharged from the air discharge openings to collide with water discharged from the plurality of water discharge openings.

Furthermore, the first thermal bonding assembly 70 that thermally bonds the laminated web (for convenience, indicated by reference numeral S in FIG. 1) formed by the first web forming assembly 50 and the second web forming assembly 60 includes either a pair of thermal embossing rolls with at least one roll surface engraved or an ultrasonic horn. As a result, macro bonding areas are formed on the laminated web. FIG. 1 illustrates a configuration of a pair of thermal embossing rolls 7.

The second thermal bonding assembly 80 includes a conveying device (suction drum 9) for the laminated web including a drum or a belt, a heating device (heater 8) for an atmosphere in which the laminated web to be conveyed is located, and an exhaust device that sucks and exhausts air from a side opposite to a side where the laminated web of the conveying device comes into contact. In the aspect shown in FIG. 1, the suction drum 9 includes an exhaust device. With such a configuration, the laminated web before the macro bonding areas are formed or the laminated web after the macro bonding areas are formed is conveyed while the atmosphere surrounding the laminated web is heated, and air is sucked and exhausted from the side opposite to the side in contact with the laminated web of the conveying device, so that hot air can pass through the laminated web, and the micro bonding areas are formed in the spun-bonded nonwoven fiber web in the laminated web.

Each assembly will be described below.

(First Web Forming Assembly)

The first web forming assembly includes a spinning spinneret A having a plurality of discharge holes for discharging the two types of thermoplastic resins melted by an extruder as composite fibers. A shape of the spinning spinneret is not particularly limited, but for example, various shapes such as a round shape and a rectangular shape can be adopted. Among them, it is preferable to use a rectangular spinneret because it is excellent in uniformity of formation.

In addition, the first web forming assembly includes a drawing device, for example, an ejector (air sucker) that suction-draws the thermoplastic resin melt-spun from the spinning spinneret with compressed air. A shape of the ejector is not particularly limited, but for example, various shapes such as a round shape and a rectangular shape can be adopted. Among the shapes, a rectangular ejector is preferably used, since an amount of the compressed air used is relatively small, energy cost is low, bonding and scraping of the yarns hardly occurs, and opening of the yarns is easy.

Furthermore, a collection device, for example, a collection net and a roll, which collects the composite fibers sucked and stretched by compressed air to form a spun-bonded nonwoven fiber web, is provided on the downstream side of the drawing device. With such a configuration, it is possible to obtain a spun-bonded nonwoven fiber web by passing the composite fibers through a fiber opening portion that reduces the peripheral air flow velocity to open the composite fibers, and then collecting the composite fibers on a moving net.

With respect to the spun-bonded nonwoven fiber web, it is also a preferred aspect that a thermal flat roll is brought into contact with a surface of the spun-bonded nonwoven fiber web from above the spun-bonded nonwoven fiber web while the spun-bonded nonwoven fiber web is placed on a moving net before a thermal bonding assembly which will be described later to temporarily bond the spun-bonded nonwoven fiber web. Accordingly, it is possible to prevent the surface layer of the spun-bonded nonwoven fiber web from being turned over or blown off during conveyance on the moving net and the deterioration of the formation, and to improve a conveyance ability from yarns collection to thermocompression bonding.

(Second Web Forming Assembly)

The second web forming assembly includes a spinning spinneret B of a non-electroconductive polymer having a plurality of spinning holes in a width direction.

The non-electroconductive polymer is not particularly limited as long as it has a non-electroconductive property. A polymer having a volume resistivity of preferably $10^{12}\cdot\Omega\cdot$cm or more and more preferably $10^{14}\cdot\Omega\cdot$cm or more is preferably used as a main component. Examples of the polymer include polyolefins such as polyethylene and polypropylene, polyesters such as polyethylene terephthalate and polylactic acid, polycarbonate, polystyrene, polyphenylene sulfite, fluorine-based resins, and mixtures thereof. Among these, materials having a polyolefin or a polylactic acid as a main component are preferable from the viewpoint of electret performance, and materials having polypropylene as a main component are more preferable. Further, the main component mentioned here means that it accounts for 50 weight % or more of the entire constituent components.

In addition, as the spinning spinneret B, a spinning spinneret by a melt blowing method is preferable because it enables in-line lamination to a spun-bonded nonwoven fiber web and a filter medium excellent in dust removing performance can be obtained.

The second web forming assembly includes a water sprayer for the spun yarn discharged from the spinning spinneret. The water sprayer includes a spray nozzle including a plurality of water discharge openings arranged in a width direction of the nonwoven fabric, and a pair of air discharge openings that are either continuously or intermittently opened over the width direction and arranged so as to sandwich the water discharge openings, the spray nozzle causing air discharged from the air discharge openings to collide with water discharged from the plurality of water discharge openings.

FIG. 2 illustrates a schematic structure of a spray nozzle. FIG. 2 is a cross-sectional view of the center of the spray nozzle in the width direction. In the spray nozzle 6 illustrated in FIG. 2, water is supplied from a water supply port 16, spread in the width direction by a water manifold 18, and discharged from the water discharge opening 31 provided at the tip 6*a* of the spray nozzle 6. In addition, air is supplied from each of air supply ports 15*a* and 15*b*, spread in the width direction by air manifolds 17*a* and 17*b*, and discharged from the air discharge openings 33*a* and 33*b*. With such a configuration, air discharged from the air discharge openings 33*a* and 33*b* collides with the water discharged from the water discharge opening 31, and the water is formed into fine water droplets by the striking force of the air.

Next, FIG. 3(*a*) shows a front view for explaining the configuration of the tip of the spray nozzle 6. In order to facilitate understanding of the drawing, the longitudinal direction of the nozzle is shortened. At the tip of the spray nozzle 6 illustrated in FIG. 3(*a*), each water discharge opening 31 has a rectangular opening end, and a plurality of water discharge openings are arranged at equal intervals in the width direction of the spray nozzle such that the openings are in a wider range than the discharge width of the molten polymer discharged from the spinneret for melt spinning as a whole. Further, an arrangement pitch P of the water discharge openings 31 is preferably 10 mm or less from the viewpoint of uniformity of water droplets in the width direction.

In addition, in the spray nozzle 6, a pair of slit-shaped air discharge openings 33*a* and 33*b* are arranged to face each other in the vicinity of the plurality of water discharge openings 31 such that the air discharge openings sandwich the plurality of water discharge openings 31. In this case, the width of the air discharge openings is wider than the entire width of the water discharge openings in order to make all the water discharged from each of the water discharge openings 31 to be fine water droplets by a uniform striking force of air. Further, each of the air discharge openings 33*a* and 33*b* may be opened in a single continuous slit in the width direction as illustrated in FIG. 3(*a*), or may be opened intermittently corresponding to the water discharge openings 31 as illustrated in FIG. 3(*b*). In addition, in the case of intermittent openings, the opening may be circular, elliptical, or the like. In the case of intermittent opening, each opening width is preferably larger than the opening width of each water discharge opening.

According to such a spray nozzle, water is discharged not from a single slit-shaped discharge opening extending in the width direction but from the plurality of water discharge openings intermittently arranged in the width direction. Thus, even when the water discharge flow rate is low, water can be discharged more uniformly in the width direction. In addition, since the continuous belt-like air is discharged substantially in the width direction by using the air discharge openings that are either continuous or intermittent in the width direction, it is possible to prevent the interference of the airflow that is likely to deteriorate the formation of the melt blown nonwoven fabric. Due to the combination of the water and air discharge structures, water can be more uniformly sprayed to the spun yarn in the nonwoven fabric width direction while reducing the discharge flow rate of water.

Figure 4:
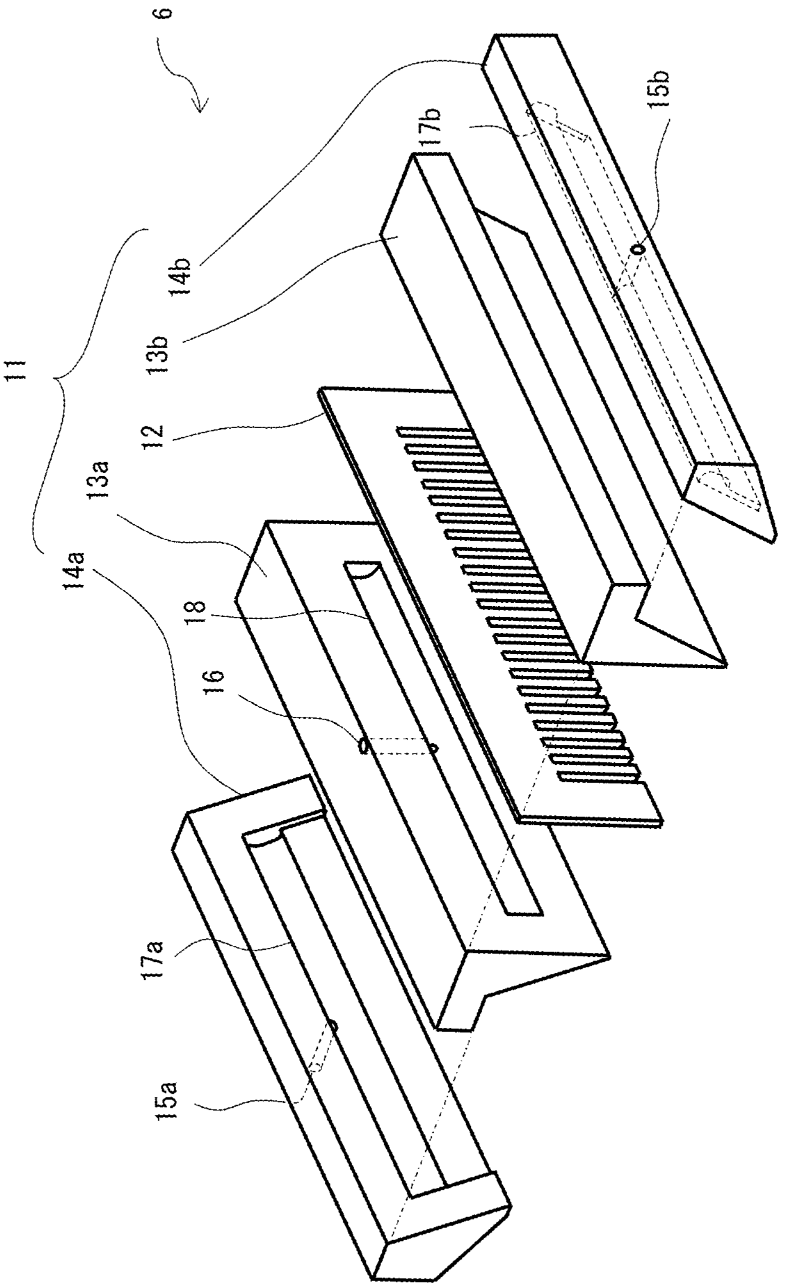
FIG. 4 is an exploded perspective view exemplifying and explaining a configuration of a spray nozzle.

Next, FIG. 4 shows an exploded perspective view for describing a configuration of the spray nozzle 6. In order to facilitate understanding of the drawing, the longitudinal direction of the nozzle is shortened. In FIG. 4, a main body housing 11 of the spray nozzle 6 includes components denoted by reference numerals 12, 13*a*, 13*b*, 14*a*, and 14*b*. Reference numerals 13*a* and 13*b* denote inner blocks for forming the water manifolds and the water discharge openings. One inner block 13*a* has a water supply port 16 for receiving water and a water manifold 18 for spreading the water in the width direction, and the water supply port 16 communicates with the water manifold 18. Reference numeral 12 denotes a comb-shaped shim sandwiched between the inner blocks 13*a* and 13*b*; when the inner blocks 13*a* and 13*b* and the shim 12 are combined, a plurality of discharge openings is formed in the width direction by a gap between comb teeth of the shim 12. Reference numerals 14*a* and 14*b* denote outer blocks, which are combined with the inner blocks 13*a* and 13*b* to form air discharge openings for discharging air. Further, the shape of the air discharge openings in the aspect illustrated in FIG. 4 is a single continuous slit in the width direction. In addition, the outer blocks 14*a* and 14*b* have air supply ports 15*a* and 15*b* for receiving air and air manifolds 17*a* and 17*b* for spreading the air in the width direction on the mating surface side with the outer blocks 14*a* and 14*b*, respectively, and the air supply ports 15*a* and 15*b* communicate with the air manifolds 17*a* and 17*b*.

The spray nozzle 6 described above is located between the spinneret 5 and the dust collection net 3 constituting the transport conveyor as illustrated in FIG. 1, and sprays water to the spun yarn melt-spun from the spinneret 5. In addition, the spun yarn Fm to which water has been sprayed is collected by the collection net 3 to be formed into a laminated web S.

The water used for spraying is obtained by removing dirt with a liquid filter or the like, and water as clean as possible is preferably used. In particular, it is preferable to use pure water such as ion-exchanged water, distilled water, or water filtered by a reverse osmosis membrane. In addition, a conductivity level of pure water is preferably $10^3$ μS/m or less, or more preferably $10^2$ μS/m or less.

(First Thermal Bonding Assembly)

The first thermal bonding assembly includes one of a pair of thermal embossing rolls in which at least one roll surface is engraved and an ultrasonic horn.

As the thermal embossing roll, in order to prevent the engraving (protrusion and depression portions) of one of the embossing rolls from being transferred to the surface of the other roll, it is preferable that the surface materials of both rolls have the same hardness; further, in order to obtain a sufficient thermal bonding effect, it is a preferred aspect that the surface materials of both rolls are made of metal.

The emboss bonding area ratio by such a thermal emboss roll is preferably 5 to 30% of the surface area of the entire laminated web. By setting the bonding area to preferably 5% or more, more preferably 8% or more, and still more preferably 10% or more, the strength that can be put to practical use as the filter medium can be obtained. On the other hand, by setting the bonding area to preferably 30% or less, more preferably 20% or less, and still more preferably 15% or less, excessive bonding can be prevented, and the elongation that can be used for practical use can be obtained.

The bonding area ratio (%) as used herein refers to an area ratio of the bonding area to the entire laminated web. Specifically, it is expressed by the following equation.

$$\text{Bonding area ratio (\%)} = \{\text{area of bonding area (mm}^2)\}/[\{\text{area of bonding area (mm}^2)\} + \{\text{area of non-bonding area (mm}^2)\}] \times 100 = \{\text{area of bonding area (mm}^2)\}/\{\text{area of laminated nonwoven fabric (mm}^2)\} \times 100$$

Although a shape of the bonding area formed by thermal bonding is not particularly limited, for example, a circular shape, an elliptical shape, a square shape, a rectangular shape, a parallelogram shape, a rhombus shape, a regular hexagon shape, and a regular octagon shape can be used. Further, the bonding area is preferably present in a uniform manner at constant intervals in each of the longitudinal direction (a conveyance direction) and the width direction of the nonwoven web. Accordingly, it is possible to reduce variations in the strength of the laminated web.

(Second Thermal Bonding Assembly)

The second thermal bonding assembly may include a conveying device for a laminated web including a drum or a belt, a heating device for the atmosphere surrounding a laminated web, and an exhaust device that sucks and exhausts air from a side opposite to a side where the laminated web of the conveying device comes into contact. With such a configuration, hot air is penetrated through the laminated web to form a micro bonding area in the spun-bonded nonwoven fiber web.

The heating device is not particularly limited, and examples thereof include a blower that forcibly blows hot air to the laminated web, and a method of heating the ambient temperature around the laminated web with a heater or the like. However, a method of heating the ambient temperature around the conveyed laminated web with a heater or the like is preferable because of excellent energy cost.

The temperature of the hot air to be penetrated through the laminated web is preferably from a temperature 20 °C lower than the melting point (Tm (°C)) of the thermoplastic resin P2 used in the spun-bonded nonwoven fiber web to a temperature 20 °C higher than the melting point (that is, (Tm−20 °C) to (Tm+20 °C)) of the thermoplastic resin P2. By setting the temperature of the hot air to preferably −20 °C (that is, (Tm−20 °C), and the same applies hereinafter) or higher, more preferably −10 °C (Tm−10 °C) or higher, and still more preferably +0 °C (Tm+0 °C) or higher with respect to the melting point of the thermoplastic resin P2, it is possible to firmly thermal-bond the contact points between the composite fibers and to obtain a filter medium containing a spun-bonded nonwoven fabric excellent in strength and rigidity. In addition, by setting the temperature of the hot air to preferably +20 °C (Tm+20 °C) or lower, more preferably +15 °C (Tm+15 °C) or lower, and still more preferably +10 °C (Tm+10 °C) or lower with respect to the melting point of the thermoplastic resin P2, it is possible to prevent the laminated web from being partially melted or broken due to excessive heat application.

In addition, the apparatus for producing a filter medium of the present invention includes a conveying device for a laminated web and an exhaust device that sucks and exhausts air from a side opposite to a side where the laminated web of the conveying device comes into contact. Specifically, the conveying device may be formed of a drum or a conveyor made of punching metal, and an exhaust device may be provided inside this assembly. With such a configuration, it is possible to suck the blown hot air or heated air and release the air to the outside while conveying the laminate.

The time for penetrating hot air or heated air (hereinafter, abbreviated as hot air or the like) through the laminated web is preferably 1 second to 20 seconds. By setting the time for penetrating hot air or the like to preferably 1 second or more, more preferably 3 seconds or more, and still more preferably 5 seconds or more, it is possible to obtain a filter medium containing a spun-bonded nonwoven fabric excellent in strength and rigidity by firmly thermal-bonding contact points between the composite fibers even in a portion where the basis weight is partially high and hot air or the like hardly penetrates. On the other hand, by setting the time for penetrating hot air or the like to preferably 20 seconds or less, more preferably 15 seconds or less, and still more preferably 10 seconds or less, it is possible to prevent the laminated web from partially melting or breaking due to excessive heat application.

The air velocity at which hot air or the like is sucked is preferably 0.5 m/s to 20 m/s. By setting the air velocity at which hot air or the like is sucked to preferably 0.5 m/s or more, more preferably 1 m/s or more, and still more preferably 1.5 m/s or more, the hot air or the like can reach into the inner portion of the laminated web, and the contact points between the composite fibers can be firmly thermally bonded to obtain a filter medium containing a spun-bonded nonwoven fabric excellent in strength and rigidity. On the other hand, by setting the air velocity to preferably 20 m/s or less, more preferably 19 m/s or less, and still more preferably 18 m/s or less, it is possible to prevent the laminated web from being stuck to a drum or a conveyor and to stably convey the laminated web. In addition, it is preferable that suction is uniformly performed at a constant interval in each of the longitudinal direction (conveying direction) and the width direction of the laminated web.

EXAMPLES

Next, the spun-bonded nonwoven fabric of the present invention will be specifically described based on examples. However, the present invention is not limited only to these examples.

[Measurement Methods]

An evaluation method used in Examples and its measurement conditions will be described. Unless otherwise described, each physical property was measured on the basis of the above-described method.

(1) Spinning Speed (m/Min):

A mass per length of 10000 m was calculated from the average single-fiber diameter described above and the solid density of the resin to be used by rounding off to one decimal place as the average single-fiber fineness (dtex). The spinning speed was calculated to two significant digits based on the formula below from the average single-fiber fineness and the discharge amount (hereinafter, abbreviated as the single hole discharge rate) (g/min) of the resin to be discharged from a single hole of the spinning spinneret, the discharge amount being set under each condition.

$$\text{Spinning speed (m/min)} = (10000 \times [\text{single hole discharge rate (g/min)}])/[\text{average single-fiber fineness}(dtex)]$$

(2) Average Single-Fiber Diameter (μm) of Composite Fibers, Presence or Absence of Micro Bonding Areas, Proportion by Number (%) of Contact Points Having Micro Bonding Areas, Average Center-to-Center Distance (μm) of Nearest Neighbor Fibers, Proportion by Number $R_1$(%) of Neighboring Composite Fibers, Proportion by Number $R_2$(%) of Neighboring Composite Fibers:

Measurement and calculation were performed through the method described before by using an electron microscope "VHX-D500" manufactured by Keyence Corporation.

(3) Area Ratio of Macro Bonding Areas (%), Shortest Distance Between Macro Bonding Areas (Mm), and Individual Area of Macro Bonding Areas ($Mm^2$):

Measurement and calculation were performed through the method described before by using an electron microscope "VHX-D500" manufactured by Keyence Corporation.

(4) Stress at 5% Elongation in Longitudinal Direction of Spun-Bonded Nonwoven Fabric (N/5 cm):

Measurement was performed by the above method using "TENSILON universal testing machine RTG-1250" manufactured by A&D Company, Limited as a measuring apparatus.

(5) Bending Resistance (Mg) of Spun-Bonded Nonwoven Fabric in Longitudinal Direction:

As a measuring apparatus, "No. 311 Gurley flexibility tester" manufactured by YASUDA SEIKI SEISAKUSHO CO., LTD. was used, and measurement was performed by the above method.

(6) Air Permeability ($Cm^3/Cm^2 \cdot Sec$)

Measurement was performed by the above method using "FX3300-IV" manufactured by TEXTEST as a measurement apparatus.

(7) Pleating Processability:

400 mountains were continuously pleated with a reciprocating pleating machine under the conditions of a pleat height of 25 mm, a pleat processing speed of 40 pleats/minute, and a back pressure of 0.1 MPa. For the spun-bonded nonwoven fabric after pleating, the shape and pitch of the mountain at the time of release were observed, and the pleating processability was ranked in the following three stages, and "A" was regarded as an acceptable.

A: The peak shape and pitch of the pleats are stable.

B: Irregularities are observed in the peak shape and pitch of the pleats.

C: A pleated shape cannot be formed.

(8) Shape Retention:

With respect to the shape retention of the spun-bonded nonwoven fabric pleated by the above-described method, the spun-bonded nonwoven fabric was fixed to a mold such that the pitch of pleated mountains was 4 mm, and left for 24 hours under a load of 5 kPa from one side. Thereafter, the pleated shape was observed and ranked in the following three stages, and "A" was regarded as an acceptable product.

A: No deformation of the pleats is observed.

B: Crushing or deformation of the pleats is partially observed.

C: Crushing or deformation of the pleats is observed on the whole.

(9) Antiviral Test:

A 5 mass % aqueous solution of an antimicrobial/antiviral agent containing a quaternary ammonium salt as an active ingredient ("Niccanon RB" manufactured by Nicca Chemical Co., Ltd.) was applied to a spun-bonded nonwoven fabric or a filter medium using a kiss roll coater, and dried by passing hot air at a temperature of 120 °C. Next, the antiviral property of the spun-bonded nonwoven fabric or filter medium was measured under the following conditions according to the method described in JIS L1922:2016 "Method for testing antiviral property of textile products".

Test virus: Influenza A virus (H3N2, A/HongKong/8/68)

Host cells: MDCK cells (canine kidney-derived cell line)

Reaction conditions: 25 °C, 2 h

Wash-out liquid: SCDLP medium

Infectivity titer determination method: Plaque measurements.

[Resin Used]

Next, the details of the resins used in examples and comparative examples will be described.

Polyester-based resin A: A polyethylene terephthalate resin (denoted as "PET" in Tables 1 to 4) dried to a water content of 50 ppm by mass or less and having an intrinsic viscosity (IV) of 0.65, a melting point of 260 °C, and a solid density of 1.38 $g/cm^3$ Polyester-based resin B: A copolymerized polyethylene terephthalate resin (denoted as "Co-PET" in Tables 1 to 4) dried to a water content of 50 ppm by mass or less and having an intrinsic viscosity (IV) of 0.64, a melting point of 230 °C, a solid density of 1.38 $g/cm^3$, and an isophthalic acid copolymerization ratio of 11 mol %

Polyethylene-based resin C: A high density polyethylene resin (denoted as "HDPE" in Tables 1 to 4) having a melt flow rate (MFR) of 30 g/10 min, a melting point of 130 °C, and a solid density of 0.955 $g/cm^3$ Polypropylene-based resin D: A polypropylene resin (denoted as "PP" in Tables 1 to 4) having a melt flow rate (MFR) of 1100 g/10 min, a melting point of 160 °C, and a solid density of 0.91 $g/cm^3$

[Heat Roll Used at the Time of Thermal Bonding]

Furthermore, details of the heat roll used at the time of thermal bonding in Examples and Comparative Examples will be described.

Metal embossing rolls: Embossing roll composed of metal engraving roll (denoted as "M-EMB" in Tables 1 to 4)

Metal flat roll: Metal flat roll (denoted as "M-FLT" in Tables 1 to 4).

Example 1

The polyester-based resin A and the polyester-based resin B were melted at temperatures of 295 °C and 280 °C, respectively. Thereafter, the polyester-based resin A as a core component and the polyester-based resin B as a sheath component were spun out from pores at a spinneret temperature (corresponding to a spinning temperature) of 295 °C, a volume ratio of core component:sheath component=80:20, and a discharge amount per single pore of 3.30 g/min. Thereafter, a filament having a circular cross-sectional shape was spun by an ejector at a spinning speed of 4400 m/min. The fiber arrangement was regulated and deposited on a moving net conveyor by an opening plate, and a fiber web composed of fibers having an average single-fiber diameter of 26.3 μm was collected. Using a thermal embossing roll formed of a combination of a metal embossing roll on which circular protrusions were engraved in a staggered arrangement such that the area ratio of the macro bonding area was 11% and the shortest distance between the macro bonding areas was 1.1 mm and a metal flat roll, the collected fiber web was thermally bonded under the condition that the temperature was 200 °C and the linear pressure applied to the fiber web was 700 N/cm on both the upper and lower rolls, thereby providing regularly arranged macro bonding areas. Thereafter, hot air having a temperature of 215 °C was further penetrated therethrough to form micro bonding areas at contact points between the composite fibers, thereby obtaining a spun-bonded nonwoven fabric having a basis weight of 50 g/m². With respect to the spinnability, it was favorable with no yarn breakage observed in spinning for 1 hour, and the obtained spun-bonded nonwoven fabric had little unevenness (mottling) in the color of its surface and had a uniform formation, as long as it was visually confirmed. Evaluation results are shown in Table 1.

Example 2

A spun-bonded nonwoven fabric was obtained by the same method as in Example 1 except that the speed of the moving net conveyor was adjusted to set the basis weight to 70 g/m². The obtained spun-bonded nonwoven fabric had little unevenness (mottling) in the color of its surface and had a uniform formation, as long as it was visually confirmed. Evaluation results are shown in Table 1.

Example 3

A spun-bonded nonwoven fabric was obtained by the same method as in Example 1 except that the discharge amount per single hole was increased to 3.85 g/min, and the filament was spun at a spinning speed of 4100 m/min by an ejector to have an average single-fiber diameter of 29.4 μm. With respect to the spinnability, it was favorable with no yarn breakage observed in spinning for 1 hour, and the obtained spun-bonded nonwoven fabric had little unevenness (mottling) in the color of its surface and had a uniform formation, as long as it was visually confirmed. Evaluation results are shown in Table 1.

Example 4

A spun-bonded nonwoven fabric was obtained by the same method as in Example 1 except that the discharge amount per single hole was reduced to 2.20 g/min, and the filament was spun at a spinning speed of 4100 m/min by an ejector to have an average single-fiber diameter of 22.3 μm. With respect to the spinnability, it was favorable with no yarn breakage observed in spinning for 1 hour, and the obtained spun-bonded nonwoven fabric had little unevenness (mottling) in the color of its surface and had a uniform formation, as long as it was visually confirmed. Evaluation results are shown in Table 1.

Example 5

A spun-bonded nonwoven fabric was obtained by the same method as in Example 1 except that the embossing roll was changed to a metal embossing roll in which the interval between the protrusions was adjusted such that the shortest distance between the macro bonding areas was 0.6 mm. The obtained spun-bonded nonwoven fabric had little unevenness (mottling) in the color of its surface and had a uniform formation, as long as it was visually confirmed. Evaluation results are shown in Table 1.

TABLE 1

| | | | Example 1 | Example 2 | Example 3 | Example 4 | Example 5 |
|---|---|---|---|---|---|---|---|
| Raw material resin and production conditions | Polyester-based resin (P1) | Type of resin | PET | PET | PET | PET | PET |
| | | Melting point [°C] | 260 | 260 | 260 | 260 | 260 |
| | Thermoplastic resin (P2) | Type of resin | Co-PET | Co-PET | Co-PET | Co-PET | Co-PET |
| | | Melting point [°C] | 230 | 230 | 230 | 230 | 230 |
| | Volume ratio between polyester-based resin (P1) and thermoplastic resin (P2) (P1:P2) | | 80:20 | 80:20 | 80:20 | 80:20 | 80:20 |
| | Discharge amount per single hole [g/min] | | 3.30 | 3.30 | 3.85 | 2.20 | 3.30 |
| | Spinning speed [m/min] | | 4400 | 4400 | 4100 | 4100 | 4400 |
| | Thermal bonding | Upper roll | M-EMB | M-EMB | M-EMB | M-EMB | M-EMB |
| | | Upper roll temperature [°C] | 200 | 200 | 200 | 200 | 200 |
| | | Lower roll | M-FLT | M-FLT | M-FLT | M-FLT | M-FLT |
| | | Lower roll temperature [°C] | 200 | 200 | 200 | 200 | 200 |
| | | Linear pressure of thermal embossing roll [N/cm] | 700 | 700 | 700 | 700 | 700 |
| | Penetration of hot air | Hot air temperature [°C] | 215 | 215 | 215 | 215 | 215 |
| | | Time for penetrating hot air [sec] | 10 | 10 | 10 | 10 | 10 |
| Spun-bonded nonwoven fabric | Composite fiber | Average single-fiber diameter (μm) | 26.3 | 26.3 | 29.4 | 22.3 | 26.3 |
| | | Presence or absence of micro bonding area | Yes | Yes | Yes | Yes | Yes |
| | | Proportion by number of contact points having micro bonding areas [%] | 99 | 100 | 97 | 100 | 100 |
| | Average center-to-center distance of nearest neighbor fibers [μm] | | 39.2 | 38.4 | 43.0 | 32.8 | 31.3 |
| | Proportion by number $R_1$ of neighboring composite fibers [%] | | 64 | 67 | 51 | 74 | 81 |
| | Proportion by number $R_2$ of neighboring composite fibers [%] | | 50 | 52 | 39 | 57 | 63 |
| | Macro bonding area | Presence or absence of macro bonding area | Yes | Yes | Yes | Yes | Yes |
| | | Form of arrangement of macro bonding areas | Staggered | staggered | Staggered | Staggered | staggered |
| | | Shape of macro bonding area | Circular | Circular | Circular | Circular | Circular |
| | | Area ratio of macro bonding areas [%] | 11 | 11 | 11 | 11 | 11 |
| | | Shortest distance between macro bonding areas [mm] | 1.1 | 1.1 | 1.1 | 1.1 | 0.6 |

TABLE 1-continued

| | Example 1 | Example 2 | Example 3 | Example 4 | Example 5 |
|---|---|---|---|---|---|
| Individual area of macro bonding area [$mm^2$] | 0.30 | 0.30 | 0.30 | 0.30 | 0.09 |
| Apparent specific surface area [$cm^2/g$] | 1101 | 1101 | 982 | 1297 | 1101 |
| Basis weight [$g/m^2$] | 50 | 70 | 50 | 50 | 50 |
| Thickness [mm] | 0.30 | 0.37 | 0.34 | 0.26 | 0.21 |
| Apparent density ($g/cm^3$) | 0.17 | 0.19 | 0.15 | 0.19 | 0.24 |
| Stress at 5% elongation in longitudinal direction [N/5 cm] | 129 | 202 | 130 | 139 | 143 |
| Bending resistance in longitudinal direction [mg] | 107 | 317 | 75 | 210 | 75 |
| Air permeability [($cm^3/cm^2$ · (sec)] | 390 | 289 | 434 | 309 | 310 |
| Pleating processability | A | A | A | A | A |
| Shape retention | A | A | A | A | A |
| Antiviral activity value [—] | 4.0 | 4.2 | 3.5 | 4.6 | 3.8 |

Example 6

A spun-bonded nonwoven fabric was obtained by the same method as in Example 1 except that the embossing roll was changed to a metal embossing roll in which circular protrusions were engraved in a staggered arrangement such that the shortest distance between macro bonding areas was 1.8 mm. The obtained spun-bonded nonwoven fabric had little unevenness (mottling) in the color of its surface and had a uniform formation, as long as it was visually confirmed. The results of evaluation are shown in Table 2.

Example 7

A spun-bonded nonwoven fabric was obtained by the same method as in Example 1 except that the embossing roll was changed to a metal embossing roll in which circular protrusions were engraved in a staggered arrangement such that the shortest distance between macro bonding areas was 2.1 mm. The obtained spun-bonded nonwoven fabric had little unevenness (mottling) in the color of its surface and had a uniform formation, as long as it was visually confirmed. The results of evaluation are shown in Table 2.

Example 8

The polyester-based resin A and the polyethylene-based resin C were melted at temperatures of 295 °C and 200 °C, respectively. Thereafter, the polyester-based resin A as a core component and the polyethylene-based resin C as a sheath component were spun out from pores at a spinneret temperature of 295 °C, a volume ratio of core:sheath=70:30, and a discharge amount per single hole of 3.30 g/min. Thereafter, a filament having a circular cross-sectional shape was spun by an ejector at a spinning speed of 4400 m/min. The fiber arrangement was regulated and deposited on a moving net conveyor by an opening plate to collect a fiber web composed of fibers having an average single-fiber diameter of 28.0 μm. Using a thermal embossing roll formed of a combination of a metal embossing roll on which circular protrusions were engraved in a staggered arrangement such that the bonding area ratio was 11% and the shortest distance between macro bonding areas adjacent to each other was 1.1 mm, and a metal flat roll, the collected fiber web was thermally bonded under the condition that the temperature was 130 °C and the linear pressure applied to the fiber web was 700 N/cm on both upper and lower rolls, thereby providing regularly arranged macro bonding areas. Thereafter, hot air having a temperature of 140 °C was further penetrated therethrough to form micro bonding areas at contact points between the composite fibers, thereby obtaining a spun-bonded nonwoven fabric having a basis weight of 50 $g/m^2$. With respect to the spinnability, it was favorable with no yarn breakage observed in spinning for 1 hour, and the obtained spun-bonded nonwoven fabric had little unevenness (mottling) in the color of its surface and had a uniform formation, as long as it was visually confirmed. The results of evaluation are shown in Table 2.

Example 9

A spun-bonded nonwoven fabric was obtained by the same method as in Example 1 except that a thermal calender roll composed of a combination of a pair of upper and lower metal flat rolls was used in place of the thermal embossing roll for the collected fiber web. In the obtained spun-bonded nonwoven fabric, there was no macro bonding areas regularly arranged, and as long as it was visually confirmed, there was little unevenness (mottling) in the color of its surface and the formation was uniform. The results of evaluation are shown in Table 2.

TABLE 2

| | | | Example 6 | Example 7 | Example 8 | Example 9 |
|---|---|---|---|---|---|---|
| Raw material resin and production conditions | Polyester-based resin (P1) | Type of resin | PET | PET | PET | PET |
| | | Melting point [°C] | 260 | 260 | 260 | 260 |
| | Thermoplastic resin (P2) | Type of resin | Co-PET | Co-PET | HDPE | Co-PET |
| | | Melting point [°C] | 230 | 230 | 130 | 230 |
| | Volume ratio between polyester-based resin (P1) and thermoplastic resin (P2) (P1:P2) | | 80:20 | 80:20 | 70:30 | 80:20 |

TABLE 2-continued

| | | | Example 6 | Example 7 | Example 8 | Example 9 |
|---|---|---|---|---|---|---|
| Spun-bonded nonwoven fabric | Discharge amount per single hole [g/min] | | 3.30 | 3.30 | 3.30 | 3.30 |
| | Spinning speed [m/min] | | 4400 | 4400 | 4400 | 4400 |
| | Thermal bonding | Upper roll | M-EMB | M-EMB | M-EMB | M-FLT |
| | | Upper roll temperature [°C] | 200 | 200 | 130 | 200 |
| | | Lower roll | M-FLT | M-FLT | M-FLT | M-FLT |
| | | Lower roll temperature [°C] | 200 | 200 | 130 | 200 |
| | | Linear pressure of thermal embossing roll [N/cm] | 700 | 700 | 700 | 700 |
| | Penetration of hot air | Hot air temperature [°C] | 215 | 215 | 140 | 215 |
| | | Time for penetrating hot air [sec] | 10 | 10 | 10 | 10 |
| | Composite fiber | Average single-fiber diameter (μm) | 26.3 | 26.3 | 28.0 | 26.3 |
| | | Presence or absence of micro bonding area | Yes | Yes | Yes | Yes |
| | | Proportion by number of contact points having micro bonding areas [%] | 96 | 100 | 100 | 98 |
| | Average center-to-center distance of nearest neighbor fibers [μm] | | 45.1 | 48.5 | 40.7 | 40.1 |
| | Proportion by number $R_1$ of neighboring composite fibers [%] | | 47 | 44 | 57 | 60 |
| | Proportion by number $R_2$ of neighboring composite fibers [%] | | 36 | 33 | 47 | 48 |
| | Macro bonding area | Presence or absence of macro bonding area | Yes | Yes | Yes | No |
| | | Form of arrangement of macro bonding areas | Staggered | Staggered | Staggered | — |
| | | Shape of macro bonding area | Circular | Circular | Circular | — |
| | | Area ratio of macro bonding areas [%] | 11 | 14 | 11 | 0 |
| | | Shortest distance between macro bonding areas [mm] | 1.8 | 2.1 | 1.1 | — |
| | | Individual area of macro bonding area [$mm^2$] | 0.81 | 0.33 | 0.30 | — |
| | Apparent specific surface area [$cm^2/g$] | | 1101 | 1101 | 1172 | 1101 |
| | Basis weight [$g/m^2$] | | 50 | 50 | 50 | 50 |
| | Thickness [mm] | | 0.33 | 0.33 | 0.33 | 0.32 |
| | Apparent density ($g/cm^3$) | | 0.15 | 0.15 | 0.15 | 0.16 |
| | Stress at 5% elongation in longitudinal direction [N/5 cm] | | 115 | 119 | 90 | 92 |
| | Bending resistance in longitudinal direction [mg] | | 128 | 139 | 85 | 111 |
| | Air permeability [($cm^3/cm^2$ · (sec)] | | 430 | 438 | 403 | 407 |
| | Pleating processability | | A | A | A | A |
| | Shape retention | | A | A | A | A |
| | Antiviral activity value [—] | | 3.6 | 3.3 | 4.3 | 4.0 |

Example 10

The polyester-based resin A and the polyethylene-based resin C were melted at temperatures of 295 °C and 200 °C, respectively. Thereafter, the polyester-based resin A as a core component and the polyethylene-based resin C as a sheath component were spun out from pores at a spinneret temperature of 295 °C, a volume ratio of core:sheath=70:30, and a discharge amount per single hole of 3.30 g/min. Thereafter, a filament having a circular cross-sectional shape was spun by an ejector at a spinning speed of 4400 m/min. The fiber arrangement was regulated and deposited on a moving net conveyor by an opening plate to form a spun-bonded nonwoven fiber web composed of fibers having an average single-fiber diameter of 28.0 μm. Further, the polypropylene-based resin D was melted at a temperature of 280 °C with respect to the spun-bonded nonwoven fiber web, and spun out from pores at a spinneret temperature of 280 °C and a discharge amount per single hole of 0.30 g/min. Thereafter, water was sprayed to the spun yarn by a spray nozzle, and melt blown nonwoven fibers were collected on the spun-bonded fiber web to form a laminated web. Thereafter, using a thermal embossing roll formed of a combination of a metal embossing roll on which circular protrusions were engraved in a staggered arrangement such that the bonding area ratio was 11% and the shortest distance between macro bonding areas adjacent to each other was 1.1 mm, and a metal flat roll, thermal bonding was performed under the condition that the temperature was 130 °C and the linear pressure applied to the laminated web was 700 N/cm on both the upper and lower rolls, whereby regularly arranged macro bonding areas were applied to the laminated web. Thereafter, hot air at a temperature of 140 °C was further penetrated through the laminated web to form micro bonding areas at contact points between the composite fibers, thereby obtaining a filter medium having a spun-bonded nonwoven fabric basis weight of 50 $g/m^2$ and a melt blown nonwoven fabric basis weight of 10 $g/m^2$. The obtained filter medium had little unevenness (mottling) in the color of its surface and had a uniform formation, as long as it was visually confirmed. Evaluation results are shown in Table 3.

TABLE 3

| | | | Example 10 |
|---|---|---|---|
| Raw material resin and production conditions | Polyester-based resin (P1) | Type of resin | PET |
| | | Melting point [°C] | 260 |
| | Thermoplastic resin (P2) | Type of resin | HDPE |
| | | Melting point [°C] | 130 |
| | Volume ratio between polyester-based resin (P1) and thermoplastic resin (P2) (P1:P2) | | 70:30 |
| | Discharge amount per single hole [g/min] | | 3.30 |
| | Spinning speed [m/min] | | 4400 |
| | Melt blown nonwoven fiber | Type of resin | PP |
| | | Melting point [°C] | 160 |
| | | Discharge amount per single hole [g/min] | 0.30 |
| | Thermal bonding | Upper roll | M-EMB |
| | | Upper roll temperature [°C] | 130 |
| | | Lower roll | M-FLT |
| | | Lower roll temperature [°C] | 130 |
| | | Linear pressure of thermal embossing roll [N/cm] | 700 |
| | Penetration of hot air | Hot air temperature [°C] | 140 |
| | | Time for penetrating hot air [sec] | 10 |
| Spun-bonded nonwoven fabric | Composite fiber | Average single-fiber diameter (μm) | 28.0 |
| | | Presence or absence of micro bonding area | Yes |
| | | Proportion by number of contact points having micro bonding areas [%] | 100 |
| | Average center-to-center distance of nearest neighbor fibers [μm] | | 41.8 |
| | Proportion by number $R_1$ of neighboring composite fibers [%] | | 53 |
| | Proportion by number $R_2$ of neighboring composite fibers [%] | | 47 |
| | Macro bonding area | Presence or absence of macro bonding area | Yes |
| | | Form of arrangement of macro bonding areas | Staggered |
| | | Shape of macro bonding area | Circular |
| | | Area ratio of macro bonding areas [%] | 11 |
| | | Shortest distance between macro bonding areas [mm] | 1.1 |
| | | Individual area of macro bonding area [mm$^2$] | 0.30 |
| | Apparent specific surface area [cm$^2$/g] | | 1172 |
| Layered nonwoven fabric | Basis weight [g/m$^2$] | | 60 |
| | Thickness [mm] | | 0.40 |
| | Apparent density (g/cm$^3$) | | 0.15 |
| | Stress at 5% elongation in longitudinal direction [N/5 cm] | | 96 |
| | Bending resistance in longitudinal direction [mg] | | 74 |
| | Air permeability [(cm$^3$/cm$^2$ · sec)] | | 75 |
| | Pleating processability | | A |
| | Shape retention | | A |
| | Antiviral activity value [−] | | 3.8 |

Comparative Example 1

A spun-bonded nonwoven fabric was obtained by the same method as in Example 9 except that the collected fiber web was further thermally bonded under the condition that the linear pressure applied to the fiber web was 200 N/cm. In the obtained spun-bonded nonwoven fabric, there was no macro bonding areas regularly arranged, and as long as it was visually confirmed, there was little unevenness (mottling) in the color of its surface and the formation was uniform. Evaluation results are shown in Table 4.

Comparative Example 2

A spun-bonded nonwoven fabric was obtained by the same method as in Example 9 except that the discharge rate per single hole was increased to 4.95 g/min, and the filament was spun at a spinning speed of 4000 m/min by an ejector to have an average single-fiber diameter of 34.0 μm. The obtained spun-bonded nonwoven fabric had no macro bonding areas arranged regularly; the formation was inferior to that of the spun-bonded nonwoven fabric of Example 9 in that the surface had significant unevenness (mottling) in the color as long as it was visually confirmed. Evaluation results are shown in Table 4.

Comparative Example 3

A spun-bonded nonwoven fabric was obtained by the same method as in Example 1 except that a regularly arranged macro bonding area was imparted to the collected fiber web, then hot air was not penetrated, and micro bonding areas were not formed at contact points between fibers. In the obtained spun-bonded nonwoven fabric, the contact points between the fibers were not bonded except at the macro bonding area, and as long as it was visually confirmed, there was little unevenness (mottling) in the color of its surface, and the formation was uniform. Evaluation results are shown in Table 4.

Comparative Example 4

Further, a spun-bonded nonwoven fabric was obtained by the same method as in Example 1 except that the discharge rate per single hole was increased to 4.95 g/min, the filament was spun at a spinning speed of 4000 m/min by an ejector, and the average single-fiber diameter was set to 34.0 μm, and a bonding process was not performed in which regularly arranged macro bonding areas were imparted to the collected fiber web, then hot air was not penetrated, and a micro bonding area was not formed at a contact point between fibers. In the obtained spun-bonded nonwoven fabric, in addition to the fact that the contact points between the fibers were not bonded at portions other than the macro bonding area, the formation was inferior to the spun-bonded nonwoven fabric of Example 1 in that the surface had significant unevenness (mottling) in the color as long as it was visually confirmed. Evaluation results are shown in Table 4.

excellent in air permeability, and also suitable for imparting functionality by an antiviral agent.

In particular, according to the spun-bonded nonwoven fabrics of Examples 1 and 3 to 9, even when compared with the conventional spun-bonded nonwoven fabrics as shown in Comparative Examples 2 and 4, and even when the basis weight is relatively low, a high antiviral activity value is shown, so that it can be said that the basis weight of the spun-bonded nonwoven fabric can be reduced, and the spun-bonded nonwoven fabric of the above Examples can also reduce the environmental impact.

TABLE 4

| | | | Comparative Example 1 | Comparative Example 2 | Comparative Example 3 | Comparative Example 4 |
|---|---|---|---|---|---|---|
| Raw material resin and production conditions | Polyester-based resin (P1) | Type of resin | PET | PET | PET | PET |
| | | Melting point [°C] | 260 | 2.60 | 260 | 260 |
| | Thermoplastic resin (P2) | Type of resin | Co-PET | Co-PET | Co-PET | Co-PET |
| | | Melting point [°C] | 230 | 230 | 230 | 230 |
| | Volume ratio between polyester-based resin (P1) and thermoplastic resin (P2) (P1:P2) | | 80:20 | 80:20 | 80:20 | 80:20 |
| | Discharge amount per single hole [g/min] | | 3.30 | 4.95 | 3.30 | 4.95 |
| | Spinning speed [m/min] | | 4400 | 4000 | 4400 | 4000 |
| | Thermal bonding | Upper roll | M-FLT | M-FLT | M-EMB | M-EMB |
| | | Upper roll temperature [°C] | 200 | 200 | 200 | 200 |
| | | Lower roll | M-FLT | M-FLT | M-FLT | M-FLT |
| | | Lower roll temperature [°C] | 200 | 200 | 200 | 200 |
| | | Linear pressure of thermal embossing roll [N/cm] | 200 | 700 | 700 | 700 |
| | Penetration of hot air | Hot air temperature [°C] | 215 | 215 | — | — |
| | | Time for penetrating hot air [sec] | 10 | 10 | — | — |
| Spun-bonded nonwoven fabric | Composite fiber | Average single-fiber diameter (μm) | 26.3 | 34.0 | 26.3 | 34.0 |
| | | Presence or absence of micro bonding area | Yes | Yes | No | No |
| | | Proportion by number of contact points having micro bonding areas [%] | 98 | 100 | 0 | 0 |
| | Average center-to-center distance of nearest neighbor fibers [μm] | | 56.5 | 59.3 | 38.3 | 51.2 |
| | Proportion by number $R_1$ of neighboring composite fibers [%] | | 25 | 20 | 68 | 28 |
| | Proportion by number $R_2$ of neighboring composite fibers [%] | | 18 | 8 | 54 | 9 |
| | Macro bonding area | Presence or absence of macro bonding area | No | No | Yes | Yes |
| | | Form of arrangement of macro bonding areas | — | — | Staggered | Staggered |
| | | Shape of macro bonding area | — | — | Circular | Circular |
| | | Area ratio of macro bonding areas [%] | 0 | 0 | 11 | 11 |
| | | Shortest distance between macro bonding areas [mm] | — | — | 1.1 | 1.1 |
| | | Individual area of macro bonding area [$mm^2$] | — | — | 0.30 | 0.30 |
| | Apparent specific surface area [$cm^2/g$] | | 1101 | 854 | 1101 | 854 |
| | Basis weight [$g/m^2$] | | 50 | 70 | 50 | 70 |
| | Thickness [mm] | | 0.42 | 0.37 | 0.26 | 0.37 |
| | Apparent density ($g/cm^3$) | | 0.12 | 0.19 | 0.19 | 0.19 |
| | Stress at 5% elongation in longitudinal direction [N/5 cm] | | 55 | 65 | 66 | 96 |
| | Bending resistance in longitudinal direction [mg] | | 150 | 222 | 47 | 35 |
| | Air permeability [($cm^3/cm^2$ · (sec)] | | 516 | 470 | 356 | 312 |
| | Pleating processability | | A | A | C | C |
| | Shape retention | | B | B | C | C |
| | Antiviral activity value [—] | | 2.6 | 2.4 | — | — |

The spun-bonded nonwoven fabric of Example 1 to 9 and the filter medium of Example 10 had sufficient strength and rigidity that can be put to practical use, and thus were excellent in pleating processability and shape retention, On the other hand, in the spun-bonded nonwoven fabrics of Comparative Examples 1 and 2 in which the average center-to-center distance of the nearest neighbor fibers was more than 50 μm, the shape retention was low, and the effect of imparting functionality by the antiviral processing agent was also low. In addition, the spun-bonded nonwoven fabrics of Comparative Examples 3 and 4 in which the contact points between the composite fibers were not bonded (having no micro bonding area) had low strength and rigidity, and thus had poor pleating processability and shape retention, and poor performance as a filter aggregate.

INDUSTRIAL APPLICABILITY

The spun-bonded nonwoven fabric obtained by the present invention can be suitably used as a filter medium constituting member as an aggregate layer that plays a role of reinforcement and form retention of a filter medium layer that plays a role of dust removing performance and the like. In particular, since the effect of imparting functionality can be significantly enhanced as compared with the conventional spun-bonded nonwoven fabric, the spun-bonded nonwoven fabric is suitably used for, for example, an air conditioner filter, an air purifier filter, and an automobile cabin filter. The spun-bonded nonwoven fabric of the present invention can be suitably used not only for air filter applications but also for other filter applications used for vehicle materials, daily life materials, industrial materials, and the like.

DESCRIPTION OF REFERENCE SIGNS

1: Spinneret for composite fibers spinning of spun-bonded nonwoven fiber web (spinning spinneret A)
2: Ejector
3: Dust collection net
4: Roll
5: Spinneret for fiber spinning of melt blown nonwoven fiber web (spinning spinneret B)
5*a*: Spinning hole
6: Spray nozzle
6*a*: Tip of spray nozzle
7: Embossing roll
8: Heater
9: Suction drum
11: Main body housing
12: Shim
13*a*, 13*b*: Inner block
14*a*, 14*b*: Outer block
15*a*, 15*b*: Air supply port
16: Water supply port
17*a*, 17*b*: Air manifold
18: Water manifold
31: Water discharge opening
33*a*, 33*b*: Air discharge opening
50: First web forming assembly
60: Second web forming assembly
70: First thermal bonding assembly
80: Second thermal bonding assembly
Fs: Spun-bonded spun yarn
Fm: Melt blown spun yarn
W: Water
S: Laminated web

The invention claimed is:

1. An apparatus for producing a filter medium, the apparatus comprising:

a first web forming assembly that forms a spun-bonded nonwoven fiber web;

a second web forming assembly that forms an electret melt blown nonwoven fiber web on the spun-bonded nonwoven fiber web to form a laminated web;

a first thermal bonding assembly that thermally bonds the laminated web to form a macro bonding area in the laminated web; and a second thermal bonding assembly that causes hot air to penetrate the laminated web to form a micro bonding area in the spun-bonded nonwoven fiber web, wherein the first web forming assembly includes:

a spinning spinneret A having a plurality of discharge holes that spin out two kinds of thermoplastic resins melted in an extruder as composite fibers;

a drawer that suction-draws and stretches the spun composite fibers with compressed air; and a collector that collects the stretched composite fibers to form a spun-bonded nonwoven fiber web, wherein the second web forming assembly includes:

a spinning spinneret B of a non-electroconductive polymer having a plurality of spinning holes in a width direction thereof, and a water sprayer for a spun yarn discharged from the spinning spinneret B, which water sprayer includes a plurality of water discharge openings arranged in the width direction and a pair of air discharge openings that opens either continuously or intermittently in the width direction and is located so as to sandwich the water discharge openings, the water sprayer formed as a spray nozzle configured to cause air discharged from the air discharge openings to collide with water discharged from the plurality of water discharge openings, wherein the first thermal bonding assembly includes:

either a pair of thermal embossing rolls with engraving applied to a surface of at least one roll thereof, or an ultrasonic horn, and wherein the second thermal bonding assembly includes:

a conveyor for the laminated web, the conveyor including a drum or a belt;

a heater for an atmosphere in which the laminated web is located; and an exhaust structure that sucks and exhausts air from a side of the conveyor opposite to a side with which the laminated web comes into contact.

2. The apparatus according to claim 1, wherein the spinning spinneret A of the first web forming assembly is a rectangular spinneret, and the drawer is a rectangular ejector.

3. The apparatus according to claim 1, wherein the first web forming assembly further comprises a thermal flat roll positioned above the collector to temporarily bond the spun-bonded nonwoven fiber web.

4. The apparatus according to claim 1, wherein the spinning spinneret B of the second web forming assembly is a melt-blowing spinning spinneret.

5. The apparatus according to claim 1, wherein in the spray nozzle of the water sprayer, an arrangement pitch P of the plurality of water discharge openings in the width direction is 10 mm or less.

6. The apparatus according to claim 1, wherein each of the pair of air discharge openings of the spray nozzle is configured as a single continuous slit in the width direction or as intermittent openings corresponding to the plurality of water discharge openings in the width direction.

7. The apparatus according to claim 1, wherein the spray nozzle comprises a comb-shaped shim sandwiched between inner blocks to define the plurality of water discharge openings.

8. The apparatus according to claim 1, wherein the first thermal bonding assembly is configured to form the macro bonding areas such that a shortest distance between adjacent macro bonding areas is 0.5 mm or more and 2.0 mm or less.

9. The apparatus according to claim 1, wherein the first thermal bonding assembly comprises a pair of thermal embossing rolls in which both roll surfaces are composed of metal.

10. The apparatus according to claim 9, wherein the pair of thermal embossing rolls is configured to provide an emboss bonding area ratio of 5% to 30% of an entire surface area of the laminated web.

11. The apparatus according to claim 1, wherein the macro bonding area formed by the first thermal bonding assembly comprises a shape selected from the group consisting of a circle, an ellipse, a square, a rectangle, a rhombus, a regular hexagon, and a regular octagon.

12. The apparatus according to claim 1, further comprising a thermal calendar roll composed of a pair of upper and lower flat rolls positioned upstream or downstream of the first thermal bonding assembly.

13. The apparatus according to claim 1, wherein the conveyor of the second thermal bonding assembly comprises a suction drum made of punching metal.

14. The apparatus according to claim 1, wherein the heater of the second thermal bonding assembly comprises a heater configured to heat an atmosphere around the conveyed laminated web.

15. The apparatus according to claim 1, wherein the exhaust structure of the second thermal bonding assembly is configured to suck air through the laminated web at a suction air velocity of 0.5 m/s to 20 m/s.

16. The apparatus according to claim 1, further comprising a coating structure configured to apply a functional agent to the filter medium using a gravure roll, a kiss roll, or a sprayer.

17. The apparatus according to claim 1, further comprising an electret charger configured to perform a corona charging treatment on the spun-bonded nonwoven fiber web at an electric field intensity of 15 kV/cm or more.

18. The apparatus according to claim 1, further comprising a pleating machine configured to fold the filter medium into a pleated shape comprising mountain folds and valley folds.

19. The apparatus according to claim 1, wherein the two kinds of thermoplastic resins comprise a polyester-based resin P1 and a thermoplastic resin P2 having a melting point lower by 20 °C or more than a melting point of the polyester-based resin P1.

20. The apparatus according to claim 1, wherein the non-electroconductive polymer 1 comprises polypropylene having a volume resistivity of $10^{12}$ Ω·cm or more.

* * * * *